(12) United States Patent
Kobayashi et al.

(10) Patent No.: US 10,802,380 B2
(45) Date of Patent: Oct. 13, 2020

(54) IMAGING DEVICE, IMAGING CONTROL METHOD, AND PROGRAM

(71) Applicant: FUJIFILM Corporation, Tokyo (JP)

(72) Inventors: Hideo Kobayashi, Saitama (JP); Kenkichi Hayashi, Saitama (JP); Koichi Tanaka, Saitama (JP); Akihiro Uchida, Saitama (JP); Seiichi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/586,448

(22) Filed: Sep. 27, 2019

(65) Prior Publication Data

US 2020/0026160 A1    Jan. 23, 2020

Related U.S. Application Data

(63) Continuation of application No. PCT/JP2018/003482, filed on Feb. 1, 2018.

(30) Foreign Application Priority Data

Mar. 30, 2017   (JP) .................. 2017-068523

(51) Int. Cl.
*G03B 17/14* (2006.01)
*G03B 5/00* (2006.01)
(Continued)

(52) U.S. Cl.
CPC .............. *G03B 17/14* (2013.01); *G02B 7/02* (2013.01); *G02B 27/646* (2013.01); *G03B 5/00* (2013.01);
(Continued)

(58) Field of Classification Search
None
See application file for complete search history.

(56) References Cited

U.S. PATENT DOCUMENTS

2007/0183762 A1   8/2007   Washisu
2008/0226277 A1   9/2008   Uenaka et al.
(Continued)

FOREIGN PATENT DOCUMENTS

CN    102998874 A    3/2013
CN    104219436 A    12/2014
(Continued)

OTHER PUBLICATIONS

International Preliminary Report on Patentability (PCT/IPEA/409) issued in International Application No. PCT/JP2018/003482 dated Jan. 9, 2019, with English translation.
(Continued)

*Primary Examiner* — William B Perkey
(74) *Attorney, Agent, or Firm* — Birch, Stewart, Kolasch & Birch, LLP.

(57) ABSTRACT

An imaging device includes: an imaging device body including an imaging element that receives reflected light representing a subject as a subject image, and a body-side suppression unit that suppresses an influence of vibration, which is applied to a device, on the subject image on the basis of a detection result of a detection unit detecting the vibration; and a control unit performing control on the body-side suppression unit to suppress the influence with a limit that is a degree for limiting the suppression of the influence performed by the body-side suppression unit and is determined according to information about an interchangeable imaging lens mounted on the imaging device body.

19 Claims, 22 Drawing Sheets

(51) Int. Cl.
*G03B 17/56* (2006.01)
*G02B 7/02* (2006.01)
*H04N 5/225* (2006.01)
*H04N 5/232* (2006.01)
*G02B 27/64* (2006.01)

(52) U.S. Cl.
CPC .......... *G03B 17/56* (2013.01); *H04N 5/2254* (2013.01); *H04N 5/23287* (2013.01); *H04N 5/23296* (2013.01)

(56) References Cited

U.S. PATENT DOCUMENTS

| | | | |
|---|---|---|---|
| 2009/0245773 A1* | 10/2009 | Uenaka | G03B 17/00 396/55 |
| 2009/0245774 A1* | 10/2009 | Uenaka | H04N 5/23287 396/55 |
| 2010/0165130 A1* | 7/2010 | Uenaka | H04N 5/2251 348/208.7 |
| 2013/0063615 A1 | 3/2013 | Takeuchi | |
| 2014/0267809 A1* | 9/2014 | Tsubaki | H04N 5/23287 348/208.6 |
| 2014/0354834 A1 | 12/2014 | Narita | |
| 2015/0042828 A1* | 2/2015 | Wakamatsu | H04N 5/23254 348/208.4 |
| 2015/0264266 A1 | 9/2015 | Katsuyama et al. | |
| 2015/0271410 A1* | 9/2015 | Shintani | H04N 5/23258 348/208.4 |
| 2016/0134814 A1* | 5/2016 | Yoneyama | H04N 5/23238 348/208.11 |
| 2016/0330377 A1 | 11/2016 | Tsuchiya | |
| 2017/0019600 A1 | 1/2017 | Koyano | |
| 2017/0257574 A1* | 9/2017 | Honjo | H04N 5/23258 |
| 2017/0272657 A1* | 9/2017 | Ito | H04N 5/23287 |
| 2017/0289476 A1* | 10/2017 | Kokubu | G03B 9/08 |
| 2019/0222763 A1* | 7/2019 | Takayanagi | H04N 5/23258 |
| 2020/0026160 A1* | 1/2020 | Kobayashi | G03B 17/14 |

FOREIGN PATENT DOCUMENTS

| | | |
|---|---|---|
| CN | 105934708 A | 9/2016 |
| CN | 106353949 A | 1/2017 |
| JP | 2006-113468 A | 4/2006 |
| JP | 2006-259568 A | 9/2006 |
| JP | 2007-212556 A | 8/2007 |
| JP | 2008-257211 A | 10/2008 |
| JP | 2010-21614 A | 1/2010 |
| JP | 2015-187712 A | 10/2015 |
| JP | 2017-21253 A | 1/2017 |
| WO | WO 2015/115132 A1 | 8/2015 |

OTHER PUBLICATIONS

International Search Report (PCT/ISA/210) issued in International Application No. PCT/JP2018/003482 dated Apr. 10, 2018, with English translation.

Written Opinion of the International Searching Authority (PCT/ISA/237) issued in International Application No. PCT/JP2018/003482 dated Apr. 10, 2018.

Office Action dated Jul. 28, 2020 in Chinese Patent Application No. 201880022332.6, with English translation.

* cited by examiner

IMAGING DEVICE, IMAGING CONTROL METHOD, AND PROGRAM

CROSS-REFERENCE TO RELATED APPLICATIONS

This application is a continuation application of International Application No. PCT/JP2018/003482, filed Feb. 1, 2018, the disclosure of which is incorporated herein by reference in its entirety. Further, this application claims priority from Japanese Patent Application No. 2017-068523, filed Mar. 30, 2017, the disclosure of which is incorporated herein by reference in its entirety.

BACKGROUND

1. Technical Field

A technique of the present disclosure relates to an imaging device, an imaging control method, and a program.

2. Related Art

An imaging device is provided with an imaging element that receives reflected light representing a subject as a subject image. In a case where shake, which is a phenomenon where an imaging device is vibrated due to the transmission of the vibration of user's hands to the imaging device, occurs, image blur, which is a phenomenon where a subject image is shifted from a specific position (for example, the position of a subject image to be obtained in a state where shake does not occur, occurs with the shake. Image blur is visually recognized by a user through an image that is obtained from imaging performed by an imaging element.

Image blur is not a phenomenon that occurs due to only shake. For example, in a case where an imaging device is installed on a vehicle, image blur may occur due to the transmission of the vibration of a vehicle to the imaging device.

For example, techniques disclosed in JP2010-021614A, JP2006-113468A, and JP2008-257211A are known as a technique for suppressing image blur. JP2010-021614A. JP2006-113468A, and JP2008-257211A disclose techniques for suppressing image blur by moving an imaging element according to shake.

SUMMARY

However, in a case where a degree for limiting the suppression of image blur is fixed despite the interchange of an imaging lens from an imaging device body, there is a concern that the quality of an image obtained from imaging performed by the imaging element may deteriorate as compared to a case where the imaging lens is not yet interchanged.

An embodiment of the invention provides an imaging device, an imaging control method, and a program that can suppress the deterioration of image quality to be caused by the interchange of an imaging lens as compared to a case where a degree for limiting the suppression of the influence of vibration on a subject image is fixed.

An imaging device according to a first aspect comprises: an imaging device body including an imaging element that receives reflected light representing a subject as a subject image, and a body-side suppression unit that suppresses an influence of vibration, which is applied to a device, on the subject image on the basis of a detection result of a detection unit detecting the vibration; and a control unit performing control on the body-side suppression unit to suppress the influence with a limit that is a degree for limiting the suppression of the influence performed by the body-side suppression unit and is determined according to information about an interchangeable imaging lens mounted on the imaging device body.

Therefore, according to the imaging device of the first aspect, the deterioration of image quality to be caused by the interchange of the imaging lens can be suppressed as compared to a case where a degree for limiting the suppression of the influence of vibration on the subject image is fixed.

According to a second aspect, in the imaging device according to the first aspect, the information includes presence/absence information representing whether or not the imaging lens includes a lens-side suppression unit suppressing the influence, and the control unit performs control on the body-side suppression unit to suppress the influence with a minimum limit in a case where the presence/absence information represents that the imaging lens includes the lens-side suppression unit.

Therefore, according to the imaging device of the second aspect, a blurring influence can be suppressed as compared to a case where the limit is not minimum despite a state where image quality does not deteriorate even though the limit is minimum.

According to a third aspect, in the imaging device according to the first or second aspect, the influence is broadly classified into a rotation influence that rotates the subject image about a center of the imaging lens and a non-rotation influence that is an influence different from the rotation influence, the body-side suppression unit is capable of selectively performing rotation influence-suppression processing for suppressing the rotation influence by rotating the imaging element about the center of the imaging lens on the basis of the detection result and non-rotation influence-suppression processing for suppressing the non-rotation influence by moving the imaging element straight in a predetermined plane crossing an optical axis on the basis of the detection result, and the control unit performs, on the body-side suppression unit, control causing the body-side suppression unit to perform only the rotation influence-suppression processing or control causing the body-side suppression unit to perform at least the non-rotation influence-suppression processing out of the rotation influence-suppression processing or the non-rotation influence-suppression processing according to the information.

Therefore, according to the imaging device of the third aspect, both the influence of vibration on the subject and the deterioration of image quality to be caused by the interchange of the imaging lens can be suppressed as compared to a case where only the rotation influence-suppression processing is always performed and a case where only the non-rotation influence-suppression processing is always performed.

According to a fourth aspect, in the imaging device according to the third aspect, the information includes a focal length of the imaging lens and the limit is determined according to the focal length.

Therefore, according to the imaging device of the fourth aspect, both the influence of vibration on the subject and the deterioration of image quality to be caused by the interchange of the imaging lens can be suppressed as compared to a case where the limit is fixed despite a change in a focal length.

According to a fifth aspect, in the imaging device according to the fourth aspect, the control unit performs control on the body-side suppression unit to cause the body-side suppression unit to perform only the rotation influence-suppression processing in a case where the focal length is equal to or smaller than a first threshold value, and performs control on the body-side suppression unit to cause the body-side suppression unit to perform at least the non-rotation influence-suppression processing out of the rotation influence-suppression processing or the non-rotation influence-suppression processing in a case where the focal length exceeds the first threshold value.

Therefore, according to the imaging device of the fifth aspect, both the influence of vibration on the subject and the deterioration of image quality to be caused by the interchange of the imaging lens can be suppressed as compared to a case % w here the suppression of the influence of vibration on the subject image is always limited with a constant limit despite a change in a focal length.

According to a sixth aspect, in the imaging device according to the fifth aspect, the control unit performs control on the body-side suppression unit to perform the non-rotation influence-suppression processing in a state where straight movement of the imaging element in a maximum movable range, which is a range where the imaging element is movable straight to the maximum, is prevented in a case where the focal length exceeds the first threshold value and is equal to or smaller than a second threshold value, which is a value exceeding the first threshold value, and performs control on the body-side suppression unit to perform the non-rotation influence-suppression processing in a state where the straight movement in the maximum movable range is allowed in a case where the focal length exceeds the second threshold value.

Therefore, according to the imaging device of the sixth aspect, both the influence of vibration on the subject and the deterioration of image quality to be caused by the interchange of the imaging lens can be suppressed as compared to a case where the non-rotation influence-suppression processing is performed in a state where the straight movement in the maximum movable range is always allowed despite a change in a focal length.

According to a seventh aspect, in the imaging device according to the third aspect, the information includes a physical quantity representing optical characteristics of a peripheral area of the imaging lens and the limit is determined according to the physical quantity.

Therefore, according to the imaging device of the seventh aspect, both the influence of vibration on the subject and the deterioration of image quality to be caused by the interchange of the imaging lens can be suppressed as compared to a case where the limit is fixed despite a change in the optical characteristics of the peripheral area of the imaging lens.

According to an eighth aspect, in the imaging device according to the seventh aspect, the control unit performs control on the body-side suppression unit to cause the body-side suppression unit to perform only the rotation influence-suppression processing in a case where the physical quantity is equal to or smaller than a first threshold value, and performs control on the body-side suppression unit to cause the body-side suppression unit to perform at least the non-rotation influence-suppression processing out of the rotation influence-suppression processing or the non-rotation influence-suppression processing in a case where the physical quantity exceeds the first threshold value.

Therefore, according to the imaging device of the eighth aspect, both the influence of vibration on the subject and the deterioration of image quality to be caused by the interchange of the imaging lens can be suppressed as compared to a case where the limit is fixed despite a change in the optical characteristics of the peripheral area of the imaging lens.

According to a ninth aspect, in the imaging device according to the eighth aspect, the control unit performs control on the body-side suppression unit to perform the non-rotation influence-suppression processing in a state where straight movement of the imaging element in a maximum movable range, which is a range where the imaging element is movable straight to the maximum, is prevented in a case where the physical quantity exceeds the first threshold value and is equal to or smaller than a second threshold value, which is a value exceeding the first threshold value, and performs control on the body-side suppression unit to perform the non-rotation influence-suppression processing in a state where the straight movement in the maximum movable range is allowed in a case where the physical quantity exceeds the second threshold value.

Therefore, according to the imaging device of the ninth aspect, both the influence of vibration on the subject and the deterioration of image quality to be caused by the interchange of the imaging lens can be suppressed as compared to a case where the non-rotation influence-suppression processing is performed in a state where the straight movement in the maximum movable range is always allowed despite a change in the optical characteristics of the peripheral area of the imaging lens.

According to a tenth aspect, in the imaging device according to the third aspect, the information includes a focal length of the imaging lens and a physical quantity representing optical characteristics of a peripheral area of the imaging lens and the limit is determined according to the focal length and the physical quantity.

Therefore, according to the imaging device of the tenth aspect, both the influence of vibration on the subject and the deterioration of image quality to be caused by the interchange of the imaging lens can be suppressed as compared to a case where the limit is fixed despite a change in a focal length and the optical characteristics of the peripheral area of the imaging lens.

According to an eleventh aspect, in the imaging device according to the tenth aspect, the control unit performs control on the body-side suppression unit to cause the body-side suppression unit to perform only the rotation influence-suppression processing in a case where the focal length is equal to or smaller than a first threshold value and the physical quantity is equal to or smaller than a second threshold value.

Therefore, according to the imaging device of the eleventh aspect, both the influence of vibration on the subject and the deterioration of image quality to be caused by the interchange of the imaging lens can be suppressed as compared to a case where the rotation influence-suppression processing and the non-rotation influence-suppression processing are always performed despite a change in a focal length and the optical characteristics of the peripheral area of the imaging lens.

According to a twelfth aspect, in the imaging device according to the tenth aspect, the control unit performs control on the body-side suppression unit to cause the body-side suppression unit to perform at least the non-rotation influence-suppression processing out of the rotation influence-suppression processing or the non-rotation influence-suppression processing in a case where the focal length exceeds a first threshold value and the physical quantity exceeds a second threshold value.

Therefore, according to the imaging device of the twelfth aspect, the non-rotation influence can be suppressed as compared to a case where only the rotation influence-suppression processing is always performed regardless of whether or not a focal length and the optical characteristics of the peripheral area of the imaging lens are changed.

According to a thirteenth aspect, in the imaging device according to the twelfth aspect, the control unit performs control on the body-side suppression unit to perform the non-rotation influence-suppression processing in a state where straight movement of the imaging element in a maximum movable range, which is a range where the imaging element is movable straight to the maximum, is prevented in a case where the focal length exceeds the first threshold value and is equal to or smaller than a third threshold value, which is a value exceeding the first threshold value, and the physical quantity exceeds the second threshold value and is equal to or smaller than a fourth threshold value, which is a value exceeding the second threshold value.

Therefore, according to the imaging device of the thirteenth aspect, the deterioration of image quality to be caused by the interchange of the imaging lens can be suppressed as compared to a case where the straight movement of the imaging element in the maximum movable range is always allowed regardless of whether or not a focal length and the optical characteristics of the peripheral area of the imaging lens are changed.

According to a fourteenth aspect, in the imaging device according to the twelfth aspect, the control unit performs control on the body-side suppression unit to perform the non-rotation influence-suppression processing in a state where straight movement of the imaging element in a maximum movable range. % which is a range where the imaging element is movable straight to the maximum, is allowed in a case where the focal length exceeds a third threshold value, which is a value exceeding the first threshold value, and the physical quantity exceeds a fourth threshold value that is a value exceeding the second threshold value.

Therefore, according to the imaging device of the fourteenth aspect, the non-rotation influence can be suppressed as compared to a case where the straight movement of the imaging element in the maximum movable range is always allowed despite a change in a focal length and the optical characteristics of the peripheral area of the imaging lens.

According to a fifteenth aspect, in the imaging device according to any one of the fourth, fifth, sixth, tenth, eleventh, twelfth, thirteenth, and fourteenth aspects, in a case where the imaging lens is provided with a zoom lens, the limit is determined according to the focal length on the premise that the zoom lens is stopped.

Therefore, according to the imaging device of the fifteenth aspect, it is possible to avoid a case where the suppression of the influence of vibration on the subject image is limited with a limit determined according to a focal length not suitable for the current state.

According to a sixteenth aspect, in the imaging device according to any one of the first to fifteenth aspects, the information includes a stop value about the imaging lens, and the limit is reduced as the stop value is increased.

Therefore, according to the imaging device of the sixteenth aspect, the influence of vibration on the subject image can be suppressed as compared to a case where the limit is fixed despite a change in a stop value.

According to a seventeenth aspect, in the imaging device according to any one of the first to sixteenth aspects, the limit is increased as a subject distance is lengthened.

Therefore, according to the imaging device of the seventeenth aspect, the deterioration of image quality to be caused by the interchange of the imaging lens can be suppressed as compared to a case where the limit is fixed despite a change in a subject distance.

According to an eighteenth aspect, in the imaging device according to any one of the first to seventeenth aspects, the limit in a case of a video acquisition mode, which is an operating mode where a video generated on the basis of a light-receiving result of the imaging element is acquired, is larger than the limit in a case of a static image acquisition mode which is an operating mode where a static image generated on the basis of a light-receiving result of the imaging element is acquired.

Therefore, according to the imaging device of the eighteenth aspect, the deterioration of image quality to be caused b) the interchange of the imaging lens can be suppressed as compared to a case where the limit is fixed regardless of whether the operating mode is the static image acquisition mode or the video acquisition mode.

An imaging control method according to a nineteenth aspect comprises performing control on a body-side suppression unit of an imaging device body to suppress an influence of vibration, which is applied to a device, on a subject image with a limit. The imaging device body includes an imaging element that receives reflected light representing a subject as the subject image and the body-side suppression unit that suppresses the influence of the vibration on the subject image on the basis of a detection result of a detection unit detecting the vibration, and the limit is a degree for limiting the suppression of the influence performed by the body-side suppression unit included in the imaging device body and determined according to information about an interchangeable imaging lens mounted on the imaging device body.

Therefore, according to the imaging control method of the nineteenth aspect, the deterioration of image quality to be caused by the interchange of the imaging lens can be suppressed as compared to a case where a degree for limiting the suppression of the influence of vibration on the subject image is fixed.

A program according to a twentieth aspect causes a computer to perform processing including performing control on a body-side suppression unit of an imaging device body to suppress an influence of vibration, which is applied to a device, on a subject image with a limit. The imaging device body includes an imaging element that receives reflected light representing a subject as the subject image and the body-side suppression unit that suppresses the influence of the vibration on the subject image on the basis of a detection result of a detection unit detecting the vibration, and the limit is a degree for limiting the suppression of the influence performed by the body-side suppression unit included in the imaging device body and determined according to information about an interchangeable imaging lens mounted on the imaging device body.

Therefore, according to the imaging device of the twentieth aspect, the deterioration of image quality to be caused by the interchange of the imaging lens can be suppressed as compared to a case where a degree for limiting the suppression of the influence of vibration on the subject image is fixed.

According to an embodiment of the invention, it is possible to obtain an effect of suppressing the deterioration of image quality to be caused by the interchange of the imaging lens as compared to a case where a degree for limiting the suppression of the influence of vibration on the subject image is fixed.

BRIEF DESCRIPTION OF THE DRAWINGS

Exemplary embodiments according to the technique of the present disclosure will be described in detail based on the following figures, wherein.

DESCRIPTION

An example of an embodiment of an imaging device according to a technique of the disclosure will be described below with reference to accompanying drawings.

In the following description, "perpendicular" refers to perpendicular in terms of including an error within an allowable range. Further, a focal length converted into an imaging element-full size format (here, for example, 36×24 mm) is employed in the following description as an example of a focal length. The reason for this is that the size of an imaging element varies depending on the type of imaging element and the like and an optical influence on an image acquired from imaging performed by an imaging element is caused by not an actual focal length but a focal length converted into an imaging element-full size format.

Furthermore, "CPU" is an abbreviation for "Central Processing Unit" in the following description. Moreover, "LCD" is an abbreviation for "Liquid Crystal Display" in the following description. Further, "I/F" is an abbreviation for "Interface" in the following description. Furthermore, "ASIC" is an abbreviation for "Application Specific Integrated Circuit" in the following description. Moreover, "FPGA" is an abbreviation for "Field-Programmable Gate Array" in the following description.

Further, "RAM" is an abbreviation for "Random Access Memory" in the following description. Furthermore, "EEPROM" is an abbreviation for "Electrically Erasable Programmable Read-Only Memory" in the following description. Moreover, "SSD" is an abbreviation for "Solid State Drive" in the following description. Further, CD-ROM is an abbreviation for "Compact Disc Read Only Memory" in the following description.

Furthermore, "JPEG" is an abbreviation for "Joint Photographic Experts Group" in the following description. Moreover, "MPEG" is an abbreviation for "Moving Picture Experts Group" in the following description. Further, "USB" is an abbreviation for "Universal Serial Bus" in the following description.

Furthermore, CCD is an abbreviation for "Charge Coupled Device" in the following description. Moreover, CMOS is an abbreviation for "Complementary Metal-Oxide-Semiconductor" in the following description. Further, "AE" is an abbreviation for "Auto Exposure" in the following description. Furthermore, "AF" is an abbreviation for "Auto Focus" in the following description.

Moreover, "BIS" is an abbreviation for "Body Image Stabilizer" in the following description. Further, "OIS" is an abbreviation for "Optical Image Stabilizer" in the following description.

First Embodiment

Figure 1:
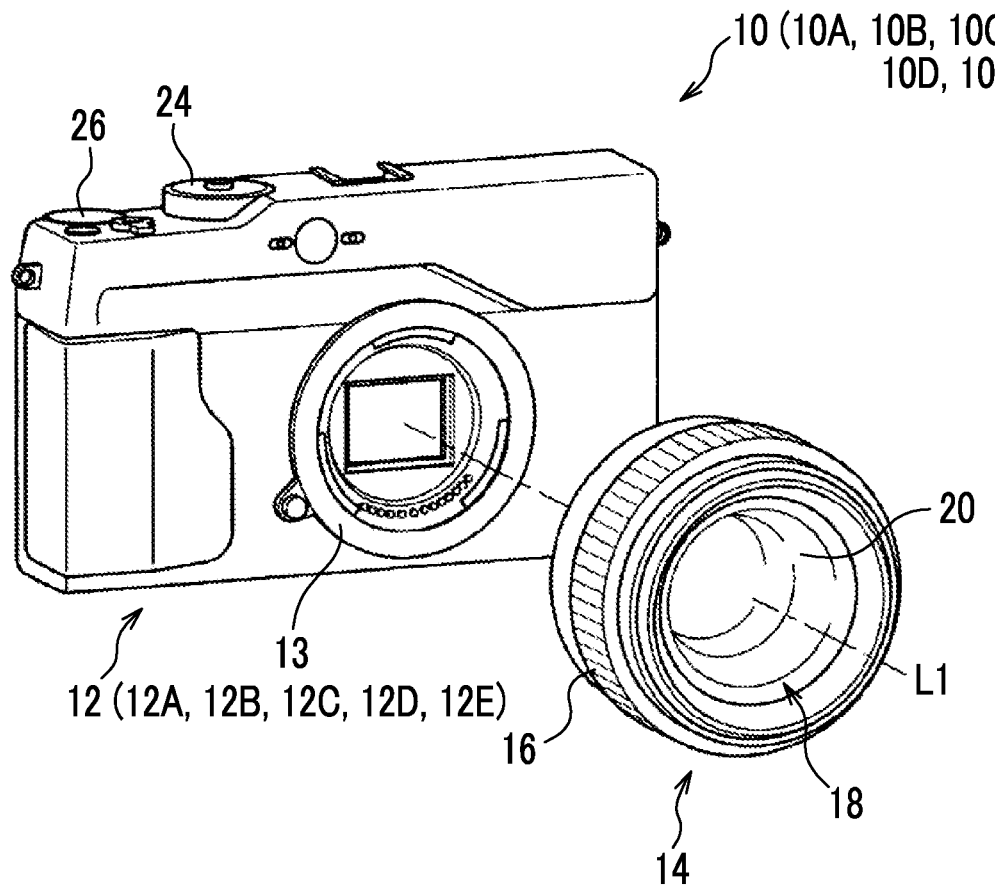
FIG. 1 is a perspective view showing an example of the appearance of imaging devices according to first to sixth embodiments.

As shown in, for example FIG. 1, an imaging device 10 is a lens-interchangeable digital camera and includes an imaging device body 12 and an imaging lens 14. For the convenience of description, "image quality" will refer to the quality of an image, which is obtained from the imaging of a subject performed by the imaging device 10, in the following description.

The imaging lens 14 is mounted on the imaging device body 12 to be interchangeable. A lens barrel of the imaging lens 14 is provided with a focus ring 16 that is used in a manual focus mode. The imaging lens 14 includes a lens unit 18. The lens unit 18 is a combination lens where a plurality of lenses including a focus lens 20 are combined. The focus lens 20 is moved in the direction of an optical axis L1 with an operation for manually rotating the focus ring 16, and subject light, which is reflected light representing a subject, forms an image on a light-receiving surface 22A (see FIG. 3) of an imaging element 22 to be described later at a focusing position corresponding to a subject distance.

A dial 24 and a release button 26 are provided on the upper surface of the imaging device body 12. The dial 24 is operated in a case where various kinds of setting, such as the switching of an imaging mode and a playback mode, are to be performed. Accordingly, the dial 24 is operated by a user, so that the imaging mode and the playback mode are selectively set as an operating mode in the imaging device 10.

The imaging device 10 has a static image taking mode and a video imaging mode as the operating mode of an imaging system. The static image taking mode is an operating mode where a static image obtained from the imaging of a subject performed by the imaging device 10 is recorded, and the video imaging mode is an operating mode where a video obtained from the imaging of a subject performed by the imaging device 10 is recorded. The static image taking mode is an example of a static image acquisition mode according to the technique of the disclosure, and the video imaging mode is an example of a video acquisition mode according to the technique of the disclosure. The static image acquisition mode according to the technique of the disclosure refers to an operating mode where a static image is acquired, and the video acquisition mode according to the technique of the disclosure refers to an operating mode where a video is acquired.

The static image taking mode and the video imaging mode are selectively set in the imaging device 10 under the imaging mode according to an instruction that is given to the imaging device 10 from a user. Further, a manual focus mode and an autofocus mode are selectively set in the static image taking mode according to an instruction that is given to the imaging device 10 from a user.

The release button 26 is adapted so that two-stage pressing operations of an imaging-preparation instruction state and an imaging instruction state can be detected. The imaging-preparation instruction state refers to, for example, a state where the release button is pressed down to an intermediate position (half-pressed position) from a stand-by position, and the imaging instruction state refers to a state where the release button is pressed down to a final pressed-down position (fully-pressed position) over the intermediate position. In the following description, "a state where the release button is pressed down to the half-pressed position from the stand-by position" will be referred to as a "half-pressed state" and "a state where the release button is pressed down to the fully-pressed position from the stand-by position" will be referred to as a "fully-pressed state".

In the autofocus mode, the release button 26 is made to be in the half-pressed state to adjust imaging conditions and is then made to be in the fully-pressed state to perform main exposure. That is, in a case where the release button 26 is made to be in the half-pressed state, focusing is controlled by the action of an AF function after an exposure state is set by the action of an AE function. In a case where the release button 26 is made to be in the fully-pressed state, imaging is performed.

Figure 2:
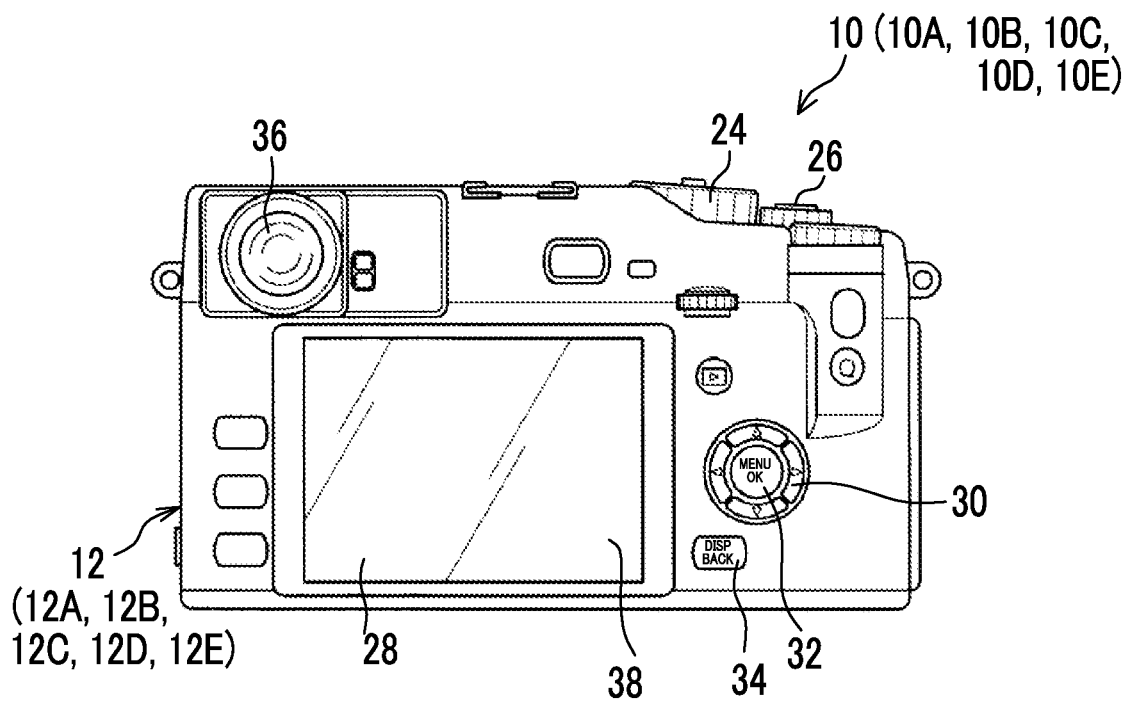
FIG. 2 is a back view showing the back sides of the imaging devices according to the first to sixth embodiments.

As shown in, for example, FIG. 2, a display 28, a cross key 30, a MENU/OK key 32, a BACK/DISP button 34, and a finder 36 are provided on the back of the imaging device body 12.

The display 28 is, for example, an LCD and displays an image that is obtained from the imaging of a subject performed by the imaging device 10, characters, and the like. The display 28 is used for the display of a live view image, which is an example of a video according to the technique of the disclosure, in the imaging mode. The live view image is also referred to as a through image and is a continuous frame image that is obtained from the imaging of a subject with a continuous frame by the imaging device 10. The display 28 is also used for the display of a static image that is obtained from imaging with a single frame in a case where an instruction to take a static image is given. Further, the display 28 is also used for the display of a playback image played back in a playback mode and the display of a menu screen, and the like.

A transmission-type touch panel 38 is laminated on the surface of the display area of the display 28. The touch panel 38 detects contact between itself and a pointer body, such as a finger or a stylus pen. The touch panel 38 outputs detection result information, which represents the result of detection of whether or not the pointer body comes into contact with the touch panel 38, to a predetermined output destination (for example, a CPU 74 (see FIG. 3) to be described later) at a predetermined interval (for example, 100 msec.). The detection result information includes two-dimensional coordinates (hereinafter, referred to as "coordinates") that can specify a contact position on the touch panel 38 where the pointer body comes into contact with the touch panel 38 in a case where the touch panel 38 detects contact between itself and a pointer body, and does not include the coordinates in a case where the touch panel 38 does not detect contact between itself and a pointer body.

The cross key 30 functions as a multifunction key that outputs various command signals for the selection of one or a plurality of menus, zoom, frame advance, and the like. The MENU/OK key 32 is an operation key having both a function as a menu button for giving a command to display one or a plurality of menus on the screen oft the display 28 and a function as an OK button for giving a command to determine and perform selected contents and the like. The BACK/DISP button 34 is used for the deletion of a desired object, such as a selected item, the cancellation of designated contents, the return of an operation state to a previous operation state, or the like.

Figure 3:
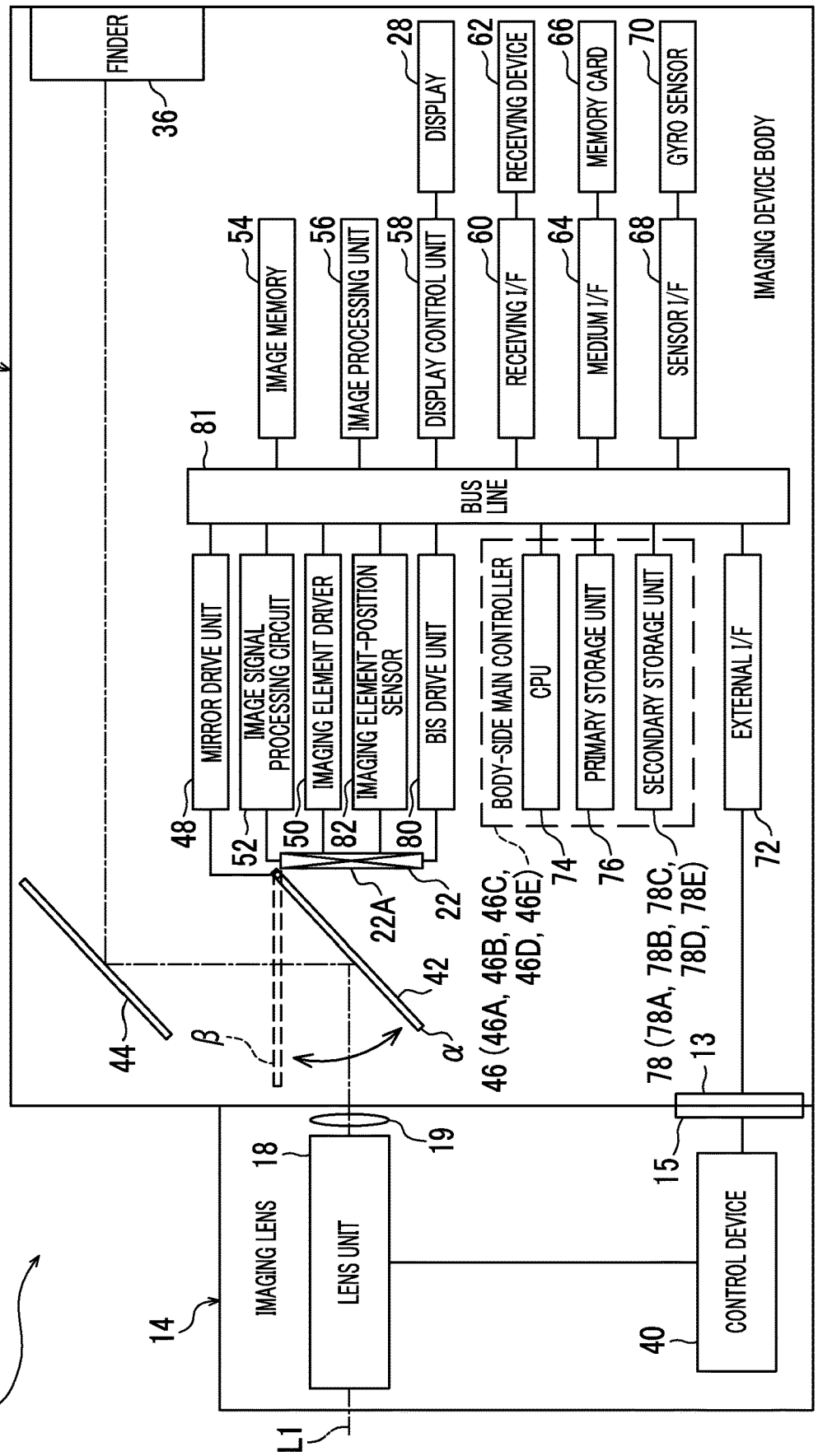
FIG. 3 is a block diagram showing an example of the hardware configuration of the imaging devices according to the first to sixth embodiments.

FIG. 3 is a block diagram of an electrical system showing an example of the hardware configuration of the imaging device 10 according to the first embodiment.

The imaging device body 12 comprises a mount 13 (see also FIG. 1), and the imaging lens 14 comprises a mount 15. The mount 15 is joined to the mount 13, so that the imaging lens 14 is mounted on the imaging device body 12 to be interchangeable.

The imaging lens 14 includes the lens unit, a stop 19, and a control device 40. The stop 19 is provided closer to the imaging device body 12 than the lens unit 18, and adjusts the amount of subject light transmitted through the lens unit 18 and guides the subject light into the imaging device body 12.

The control device 40 is electrically connected to the imaging device body 12 through the mounts 13 and 15, and controls the entire imaging lens 14 according to an instruction from the imaging device body 12.

The imaging device body 12 includes an imaging element 22, a first mirror 42, a second mirror 44, a body-side main controller 46, a mirror drive unit 48, an imaging element driver 50, an image signal processing circuit 52, an image memory 54, an image processing unit 56, and a display control unit 58. Further, the imaging device body 12 includes a receiving I/F 60, a receiving device 62, a medium I/F 64, a memory card 66, a sensor I/F 68, a gyro sensor 70, and an external I/F 72. Furthermore, the imaging device body 12 includes a BIS drive unit 80 and an imaging element-position sensor 82.

The body-side main controller 46 is an example of a computer according to the technique of the disclosure, and comprises a CPU 74, a primary storage unit 76, and a secondary storage unit 78. The CPU 74 controls the entire imaging device 10. The primary storage unit 76 is a volatile memory that is used as a work area and the like at the time of execution of various programs. Examples of the primary storage unit 76 include a RAM. The secondary storage unit 78 is a non-volatile memory that stores various programs, various parameters, and the like in advance. Examples of the secondary storage unit 78 include an EEPROM, a flash memory, and the like.

The CPU 74, the primary storage unit 76, and the secondary storage unit 78 are connected to a bus line 81. Further, the mirror drive unit 48, the imaging element driver 50, and the image signal processing circuit 52 are also connected to the bus line 81. Furthermore, the image memory 54, the image processing unit 56, the display control unit 58, the receiving I/F 60, the medium I/F 64, and the sensor I/F 68 are also connected to the bus line 81. Moreover, the BIS drive unit 80 and the imaging element-position sensor 82 are also connected to the bus line 81.

The first mirror 42 is a movable mirror that is interposed between the light-receiving surface 22A of the imaging element 22 and the lens unit 18 and is movable between a light-receiving surface covering position α and a light-receiving surface opening position β.

The first mirror 42 is connected to the mirror drive unit 48, and the mirror drive unit 48 drives the first mirror 42 under the control of the CPU 74 to selectively dispose the first mirror 42 at the light-receiving surface covering position α and the light-receiving surface opening position β. That is, the first mirror 42 is disposed at the light-receiving surface covering position α by the mirror drive unit 48 in a case where subject light is not to be received by the light-receiving surface 22A, and is disposed at the light-receiving surface opening position β by the mirror drive unit 48 in a case where subject light is to be received by the light-receiving surface 22A.

At the light-receiving surface covering position α, the first mirror 42 covers the light-receiving surface 22A and reflects the subject light sent from the lens unit 18 to guide the subject light to the second mirror 44. The second mirror 44 reflects subject light, which is guided from the first mirror 42, to guide the subject light to the finder 36 through an optical system (not shown). The finder 36 transmits the subject light that is guided by the second mirror 44.

At the light-receiving surface opening position α, a state where the light-receiving surface 22A is covered with the first mirror 42 is released and subject light is received by the light-receiving surface 22A without being reflected by the first mirror 42.

The imaging element driver 50 is connected to the imaging element 22, and supplies driving pulses to the imaging element 22 under the control of the CPU 74. The respective pixels of the imaging element 22 are driven according to the driving pulses that are supplied by the imaging element driver 50. A CCD image sensor is used as the imaging element 22 in the first embodiment, but the technique of the disclosure is not limited thereto and other image sensors, such as a CMOS image sensor, may be used.

The image signal processing circuit 52 reads image signals corresponding to one frame for each pixel from the imaging element 22 under the control of the CPU 74. The image signal processing circuit 52 performs various kinds of processing, such as correlative double sampling processing, automatic gain control, and A/D conversion, on the read image signals. The image signal processing circuit 52 outputs the image signals, which are digitized by various kinds of processing performed on the image signals, to the image memory 54 for each frame at a specific frame rate (for example, several tens of frames/s) that is regulated according to a clock signal supplied from the CPU 74.

The image memory 54 temporarily keeps the image signals that are input from the image signal processing circuit 52.

The image processing unit 56 acquires image signals from the image memory 54 for each frame at a specific frame rate, and performs various kinds of processing, such as gamma correction, luminance/color difference conversion, and compression processing, on the acquired image signals. Further, the image processing unit 56 outputs the image signals, which are obtained through the various kinds of processing, to the display control unit 58 for each frame at a specific frame rate. Furthermore, the image processing unit 56 outputs the image signals, which are obtained through the various kinds of processing, to the CPU 74 in response to the request of the CPU 74.

The display control unit 58 is connected to the display 28, and controls the display 28 under the control of the CPU 74. Further, the display control unit 58 outputs the image signals, which are input from the image processing unit 56, to the display 28 for each frame at a specific frame rate.

The display 28 displays an image, which is represented by the image signals input from the display control unit 58 at a specific frame rate, as a live view image. Furthermore, the display 28 also displays a static image that is a single frame image obtained from imaging with a single frame. A playback image, a menu screen, and the like are displayed on the display 28 in addition to a live view image.

The receiving device 62 includes the dial 24, the release button 26, the cross key 30, the MENU/OK key 32, the BACK/DISP button 34, the touch panel 38, and the like, and receives various instructions from a user.

The receiving device 62 is connected to the receiving I/F 60 and outputs instruction content signals, which represent the contents of received instructions, to the receiving I/F 60. The receiving I/F 60 outputs the instruction content signals, which are input from the receiving device 62, to the CPU 74.

The CPU 74 performs processing corresponding to the instruction content signals that are input from the receiving I/F 60.

The medium I/F 64 is connected to the memory card 66 and records and reads an image file in and from the memory card 66 under the control of the CPU 74. Under the control of the CPU 74, the image file, which is read from the memory card 66 by the medium I/F 64, is subjected to decompression processing by the image processing unit 56 and is displayed on the display 28 as a playback image. The "image file" mentioned here is broadly classified into a static image file representing a static image and a video file representing a video.

An operating mode is switched in the imaging device 10 according to an instruction that is received by the receiving device 62. For example, the static image taking mode and the video imaging mode are selectively set in the imaging device 10 under the imaging mode according to an instruction that is received by the receiving device 62. A static image file can be recorded in the memory card 66 under the static image taking mode, and a video file can be recorded in the memory card 66 under the video imaging mode.

In a case where an instruction to take a static image is received by the release button 26 under the static image taking mode, the CPU 74 controls the imaging element driver 50 to cause the imaging element 22 to perform main exposure corresponding to one frame. The image processing unit 56 acquires image signals, which are obtained from the exposure corresponding to one frame, under the control of the CPU 74, and performs compression processing on the acquired image signals to generate a static image file having a specific static image format. Here, the specific static image format refers to, for example, a JPEG format. The static image file is recorded in the memory card 66 through the medium I/F 64 by the image processing unit 56 under the control of the CPU 74.

In a case where an instruction to take a video is received by the release button 26 under the video imaging mode, the image processing unit 56 performs compression processing on image signals for a live view image to generate a video file having a specific video format. Here, the specific video format refers to, for example, a MPEG format. The video file is recorded in the memory card 66 through the medium I/F 64 by the image processing unit 56 under the control of the CPU 74.

The gyro sensor 70 is connected to the sensor I/F 68, detects angular velocities in a yaw direction, a roll direction, and a pitch direction, and outputs angular velocity information, which represents the detected angular velocities, to the sensor I/F 68. The sensor I/F 68 outputs the angular velocity information, which is input from the gyro sensor 70, to the CPU 74. The CPU 74 performs processing corresponding to the angular velocity information that is input from the sensor I/F 68. The angular velocity information is an example of detection results according to the technique of the disclosure.

The BIS drive unit 80 is connected to the imaging element 22, and moves the imaging element 22 under the control of the CPU 74. The imaging element 22 and the BIS drive unit 80 are an example of a body-side suppression unit according to the technique of the disclosure.

The BIS drive unit 80 suppresses the influence of vibration, which is applied to the imaging device 10, on a subject image on the basis of the detection results of the gyro sensor 70. The influence of vibration, which is applied to the imaging device 10, on a subject image is broadly classified into a rotation influence and a non-rotation influence. For the convenience of description, the rotation influence and the non-rotation influence will be simply referred to as "blurring influences" in the following description in a case where the rotation influence and the non-rotation influence do not need to be described while being distinguished from each other.

The rotation influence refers to an influence for rotating a subject image about an optical axis L1 among the influences of vibration, which is applied to the imaging device 10, on the subject image. The non-rotation influence refers to an influence different from the rotation influence among the influences of vibration, which is applied to the imaging device 10, on the subject image.

The BIS drive unit 80 includes a driving source (not shown) for an imaging element that generates power to be applied to the imaging element 22. Examples of the driving source for an imaging element include a magnet, a flat coil, and a stepping motor. The BIS drive unit 80 selectively performs rotation influence-suppression processing and non-rotation influence-suppression processing as processing for suppressing image blur by operating the driving source for an imaging element under the control of the CPU 74.

The rotation influence-suppression processing means processing referred to as so-called roll correction, and refers to processing for suppressing the rotation influence by rotating the imaging element 22 about the optical axis L1 on the basis of the detection results of the gyro sensor 70. In contrast, the non-rotation influence-suppression processing refers to processing for suppressing the non-rotation influence by moving the imaging element 22 straight in a first predetermined plane on the basis of the detection results of the gyro sensor 70. Here, "in a first predetermined plane" refers to, for example, "in a two-dimensional plane" perpendicular to the optical axis L1 in a state where vibration is not applied to the imaging device 10. For the convenience of description, the rotation influence-suppression processing and the non-rotation influence-suppression processing will be referred to as "influence-suppression processing" in the following description in a case where the rotation influence-suppression processing and the non-rotation influence-suppression processing do not need to be described while being distinguished from each other.

The imaging element-position sensor 82 includes, for example, a magnet and a hall element, and detects the position of the imaging element 22 in the first predetermined plane and outputs imaging element-position information, which represents the detected position, to the CPU 74. The CPU 74 calculates imaging element-destination information which represents a destination where the blurring influence can be suppressed as the destination of the imaging element 22 in the influence-suppression processing, that is, the destination of the imaging element 22 in the first predetermined plane by using the angular velocity information and the imaging element-position information. Then, the CPU 74 outputs the calculated imaging element-destination information to the BIS drive unit 80. The BIS drive unit 80 moves the imaging element 22 to a destination, which is represented by the imaging element-destination information input from the CPU 74, in the first predetermined plane.

In a case where the mount 15 is connected to the mount 13, the external I/F 72 is connected to the control device 40 of the imaging lens 14 and takes charge of the transmission and reception of various kinds of information between the CPU 74 and the control device 40.

Figure 4:
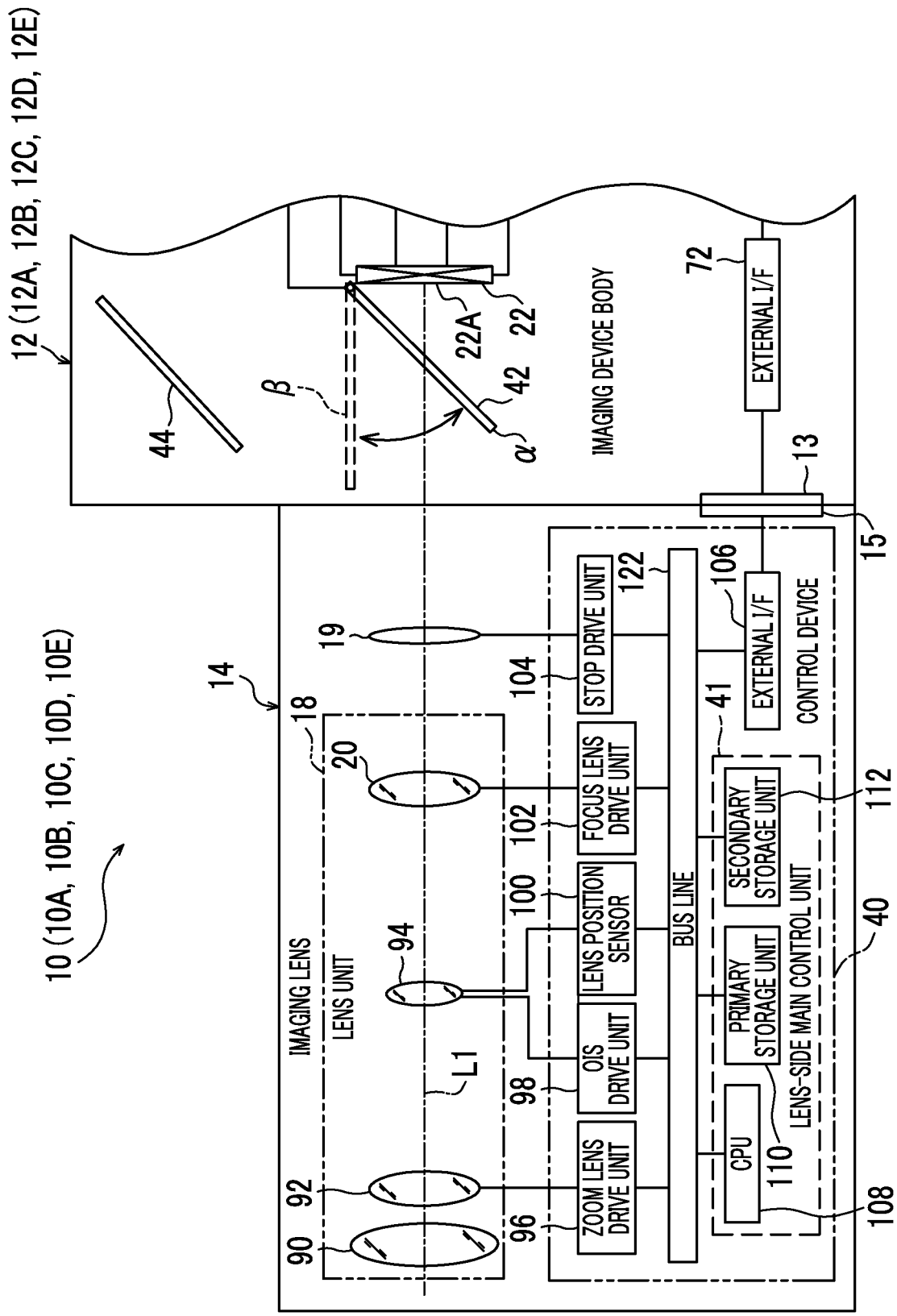
FIG. 4 is a block diagram showing an example of the hardware configuration of imaging lenses that are included in the imaging devices according to the first to sixth embodiments.

As shown in, for example, FIG. 4, the lens unit 18 includes an incident lens 90, a zoom lens 92, an anti-vibration lens 94, and a focus lens 20. The incident lens 90, the zoom lens 92, the anti-vibration lens 94, and the focus lens 20 are arranged along the optical axis L1; and the focus lens 20, the anti-vibration lens 94, the zoom lens 92, and the incident lens 90 are arranged along the optical axis L1 in this order from the stop 19.

Subject light is incident on the incident lens 90. The incident lens 90 transmits the subject light and guides the subject light to the zoom lens 92. The zoom lens 92 is a lens, which is movable along the optical axis L1, and is moved along the optical axis L1 to change the magnification of a subject image. The zoom lens 92 transmits the subject light, which is incident from the incident lens 90, and guides the subject light to the anti-vibration lens 94.

The anti-vibration lens 94 is a lens, which is movable in a direction where image blur is to be offset (for example, a direction perpendicular to the optical axis L1), and transmits the subject light, which is incident from the zoom lens 92, and guides the subject light to the focus lens 20.

The focus lens 20 is a lens, which is movable along the optical axis L1, and is moved along the optical axis L1 to change the focus state of a subject image that is formed on the light-receiving surface 22A of the imaging element 22. The focus lens 20 transmits the subject light, which is incident from the anti-vibration lens 94, and guides the subject light to the stop 19. The stop 19 adjusts the amount of the subject light that is incident from the anti-vibration lens 94, transmits the subject light, and guides the subject light to the imaging device body 12.

The control device 40 includes a lens-side main control unit 41, a zoom lens drive unit 96, an OIS drive unit 98, a lens position sensor 100, a focus lens drive unit 102, a stop drive unit 104, and an external I/F 106.

The lens-side main control unit 41 comprises a CPU 108, a primary storage unit 110, and a secondary storage unit 112. The CPU 108 controls the entire imaging lens 14. The primary storage unit 110 is a volatile memory that is used as a work area and the like at the time of execution of various programs. Examples of the primary storage unit 110 include a RAM. The secondary storage unit 112 is a non-volatile memory that stores various programs, various parameters, and the like in advance. Examples of the secondary storage unit 112 include an EEPROM, a flash memory, and the like.

The CPU 108, the primary storage unit 110, and the secondary storage unit 112 are connected to a bus line 122. Further, the zoom lens drive unit 96, the OIS drive unit 98, the lens position sensor 100, the focus lens drive unit 102, the stop drive unit 104, and the external I/F 106 are also connected to the bus line 122.

In a case where the mount 15 is connected to the mount 13, the external I/F 106 is connected to the external I/F 72 of the imaging device body 12 and takes charge of the transmission and reception of various kinds of information between the CPU 108 and the CPU 74 of the imaging device body 12 in cooperation with the external I/F 72.

The zoom lens drive unit 96 includes a zoom lens-driving motor (not shown), and moves the zoom lens 92 along the optical axis L1 by operating the zoom lens-driving motor under the control of the CPU 108 according to an instruction that is received by the receiving device 62. That is, the zoom lens drive unit 96 moves the zoom lens 92 along the optical axis L1 by operating the zoom lens-driving motor according to an instruction from the CPU 108 to transmit the power of the zoom lens-driving motor to the zoom lens 92.

The OIS drive unit 98 includes a driving source (not shown) for an anti-vibration lens that generates power to be applied to the anti-vibration lens 94. Examples of the driving source for an anti-vibration lens include a magnet and a flat coil. The OIS drive unit 98 suppresses the non-rotation influence by moving the anti-vibration lens 94 straight in a second predetermined plane under the control of the CPU 108 on the basis of the detection results of the gyro sensor 70. Here, "in a second predetermined plane" refers to, for example, "in a two-dimensional plane" perpendicular to the optical axis L1 in a state where vibration is not applied to the imaging device 10. The anti-vibration lens 94 and the OIS drive unit 98 are an example of a lens-side suppression unit according to the technique of the disclosure.

The lens position sensor 100 includes, for example, a magnet and a hall element, and detects the position of the anti-vibration lens 94 in the second predetermined plane and outputs lens position information, which represents the detected position, to the CPU 108. The CPU 108 calculates lens destination information by using the lens position information and the angular velocity information that is acquired from the imaging device body 12 through the external I/F 106. The lens destination information refers to information that represents a destination where the non-rotation influence can be suppressed as a destination to which the anti-vibration lens 94 is moved by the OIS drive unit 98, that is, the destination of the anti-vibration lens 94. Then, the CPU 108 outputs the calculated lens destination information to the OIS drive unit 98. The OIS drive unit 98 moves the anti-vibration lens 94 to a destination that is represented by the lens destination information input from the CPU 108.

The focus lens drive unit 102 includes a focus lens-driving motor (not shown). The focus lens drive unit 102 moves the focus lens 20 along the optical axis L1 by operating the focus lens-driving motor under the control of the CPU 108 according to an instruction that is received by the receiving device 62. That is, the focus lens drive unit 102 moves the focus lens 20 along the optical axis L1 by operating the focus lens-driving motor according to an instruction from the CPU 108 to transmit the power of the focus lens-driving motor to the focus lens 20.

The stop drive unit 104 includes a stop-driving motor (not shown). The stop drive unit 104 adjusts the size of the aperture of the stop 19 by operating the stop-driving motor under the control of the CPU 108 according to an instruction that is received by the receiving device 62.

Figure 5:
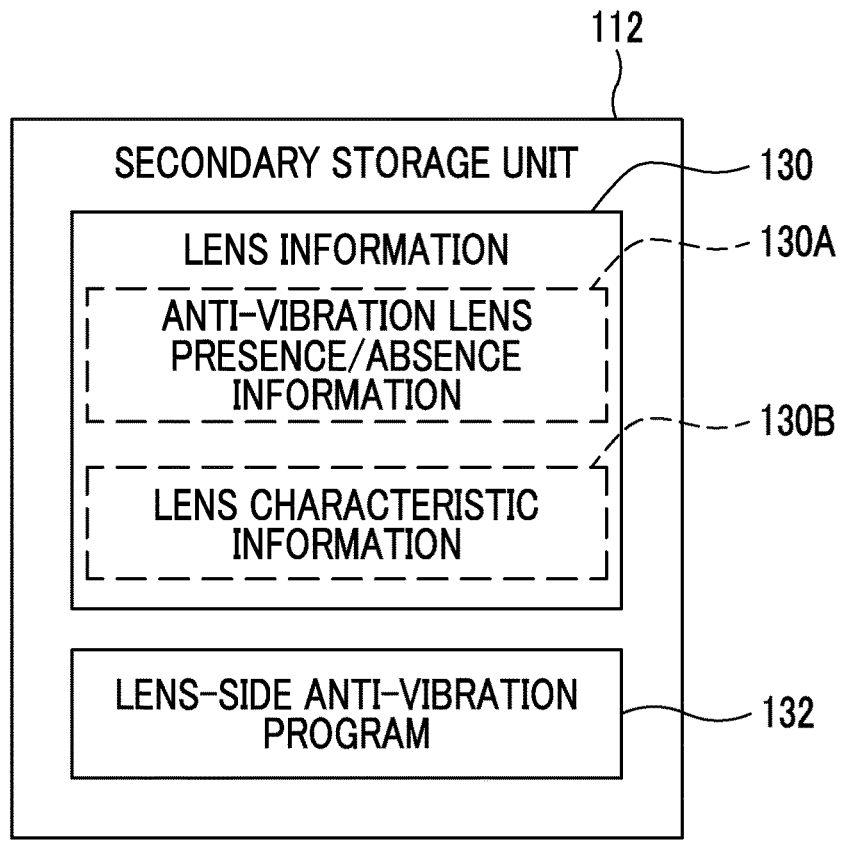
FIG. 5 is a conceptual diagram showing an example of contents stored in secondary storage units of lens-side main control units that are included in the imaging lenses of the imaging devices according to the first to sixth embodiments.

As shown in, for example, FIG. 5, the secondary storage unit 112 of the lens-side main control unit 41 stores lens information 130 and a lens-side anti-vibration program 132.

The lens information 130 is information relating to the characteristics of the imaging lens 14, and is transmitted to the CPU 74 of the imaging device body 12 from the CPU 108 in a case where the imaging lens 14 is connected to the imaging device body 12 through the mounts 13 and 15.

The lens information 130 includes anti-vibration lens-presence/absence information 130A and lens characteristic information 130B. The anti-vibration lens-presence/absence information 130A is an example of presence/absence information according to the technique of the disclosure, and is information representing whether or not the imaging lens 14 includes the anti-vibration lens 94. The lens characteristic information 130B is information that includes the focal length of the lens unit 18 (hereinafter, simply referred to as a "focal length"), lens position information, zoom lens position information, focus lens information, and the like. The zoom lens position information refers to information that represents the position of the zoom lens 92 on the optical axis L1. The focus lens information refers to information that represents the position of the focus lens 20 on the optical axis L1. Further, the lens characteristic information 130B also includes physical quantities that represent the optical characteristics of the peripheral area of the lens unit 18.

Here, the amount of ambient light and the peripheral resolution of the lens unit 18 are employed as examples of the physical quantities representing the optical characteristics of the peripheral area of the lens unit 18, but the technique of the disclosure is not limited thereto. For example, the physical quantities representing the optical characteristics of the peripheral area of the lens unit 18 may be the amount of ambient light or the peripheral resolution of the lens unit 18.

The amount of ambient light of the lens unit 18 refers to the amount of light in the peripheral area of an image circle formed by the lens unit 18. The peripheral area of the image circle refers to an annular area of the image circle other than a circular area that has a radius corresponding to 80% of the radius of the image circle from the center of the image circle in a radial direction. Further, the peripheral resolution refers to a resolution that can be obtained from the amount of ambient light of the lens unit 18.

For the convenience of description, the amount of ambient light is expressed by a percentage as a ratio of the amount of ambient light to the amount of light at the center of the image circle in the following description in a case where the amount of light at the center of the image circle is assumed as 100%.

The CPU 108 reads the lens-side anti-vibration program 132 from the secondary storage unit 112, develops the lens-side anti-vibration program 132 in the primary storage unit 110, and performs lens-side anti-vibration processing (see FIG. 9) to be described later according to the developed lens-side anti-vibration program 132.

Figure 6:
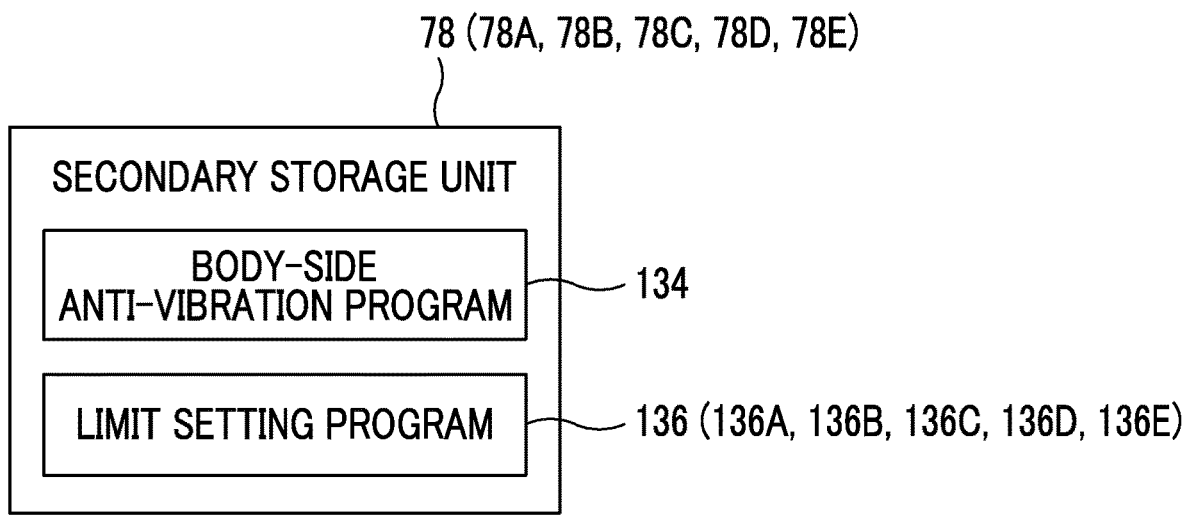
FIG. 6 is a conceptual diagram showing an example of contents stored in secondary storage units of body-side main controllers that are included in imaging device bodies of the imaging devices according to the first to sixth embodiments.

As shown in, for example FIG. 6, the secondary storage unit 78 of the body-side main controller 46 stores a body-side anti-vibration program 134 and a limit setting program 136.

The CPU 74 reads the body-side anti-vibration program 134 from the secondary storage unit 78, develops the body-side anti-vibration program 134 in the primary storage unit 76, and performs body-side anti-vibration processing (see FIG. 10) to be described later according to the developed body-side anti-vibration program 134. Further, the CPU 74 reads the limit setting program 136 from the secondary storage unit 78, develops the limit setting program 136 in the primary storage unit 76, and performs limit setting processing to be described later according to the developed limit setting program 136. In other words, the CPU 74 operates as a control unit according to the technique of the disclosure by executing the limit setting program 136.

Accordingly, the CPU 74 performs control causing the BIS drive unit 80 to suppress a blurring influence with a predetermined limit. Here, the predetermined limit is a limit that is a degree for limiting the suppression of a blurring influence, and refers to a limit that is determined according to the lens information 130. For the convenience of description, the "predetermined limit" will be simply referred to as a "limit" in the following description.

Figure 7:
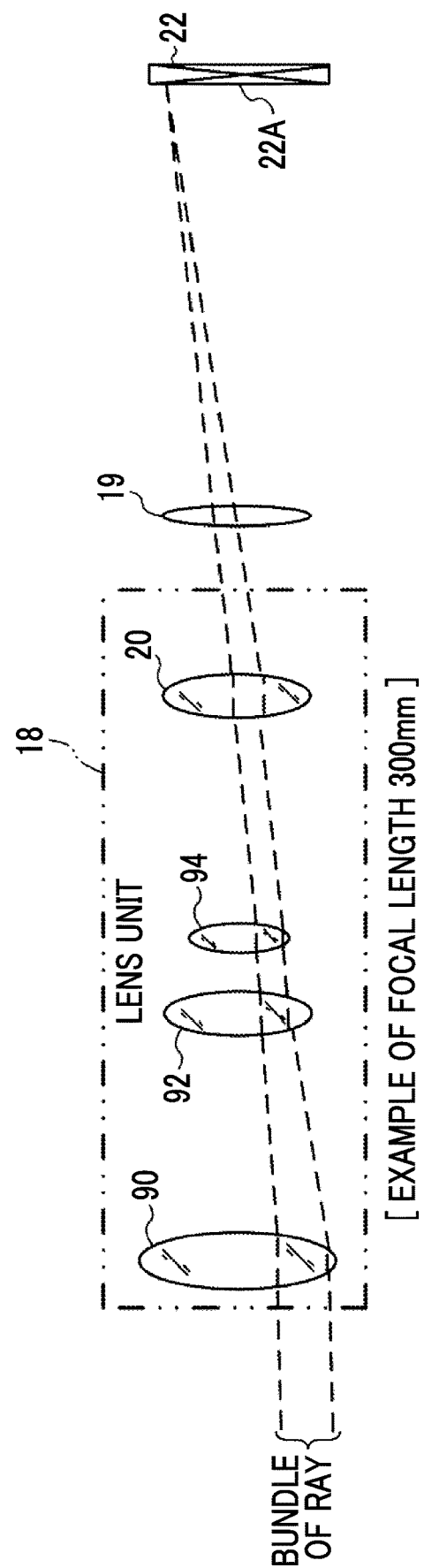
FIG. 7 is a conceptual diagram showing an example of the bundle of rays that is incident on the imaging device body through a lens unit and a stop in a case where the focal length of each of the imaging devices according to the first to sixth embodiments is 300 mm.
Figure 8:
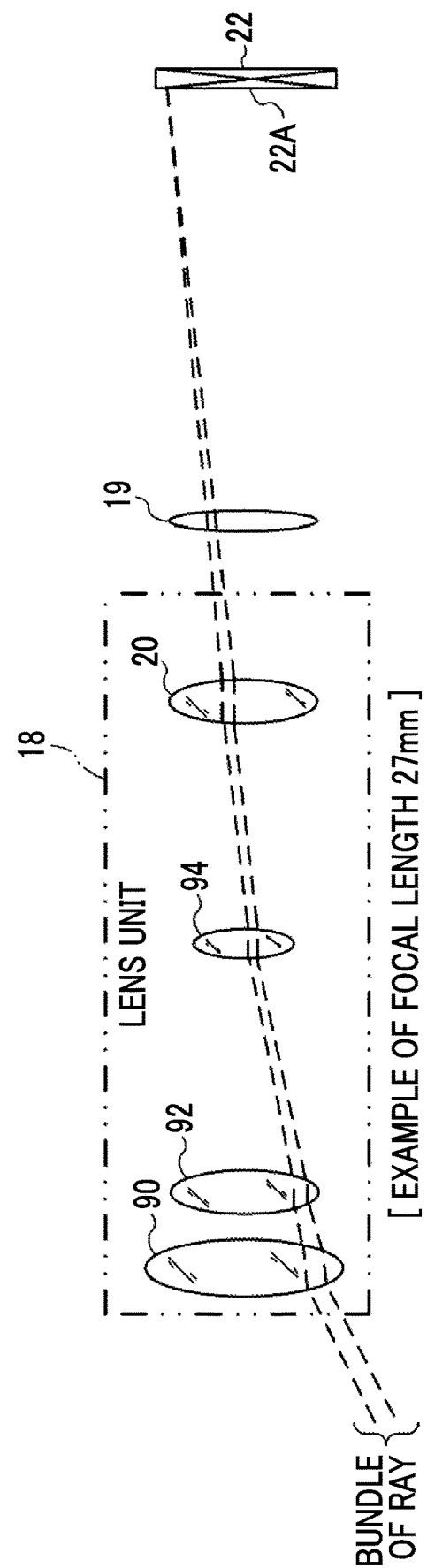
FIG. 8 is a conceptual diagram showing an example of the bundle of rays that is incident on the imaging device body through the lens unit and the stop in a case where the focal length of each of the imaging devices according to the first to sixth embodiments is 27 mm.

Further, a limit is also determined according to a focal length in this embodiment. The reason for this is as follows: the bundle of rays is thinner as a focal length is shorter as shown in, for example, FIGS. 7 and 8, and the amount of ambient light is smaller and vignetting is more likely to occur as the bundle of rays is thinner. As a result, the deterioration of image quality is caused.

Next, the actions of parts of the imaging device 10 according to the technique of the disclosure will be described.

First, the lens-side anti-vibration processing, which is performed by the CPU 108 of the imaging lens 14 in a case where the power supply of the imaging device 10 is turned on (power is supplied to the imaging device 10) in a state where the imaging lens 14 is connected to the imaging device body 12 through the mounts 13 and 15, will be described with reference to FIG. 9.

Figure 9:
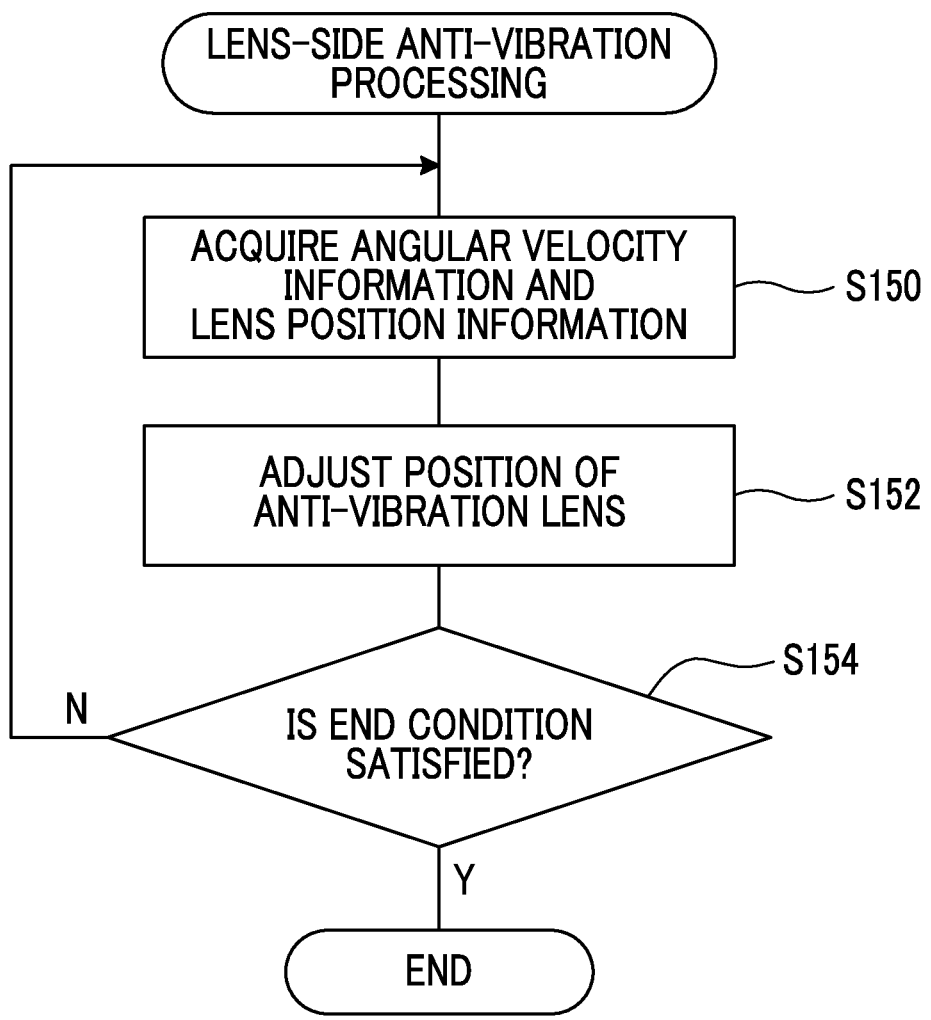
FIG. 9 is a flowchart showing an example of the flow of lens-side anti-vibration processing according to the first to sixth embodiments.

In the lens-side anti-vibration processing shown in FIG. 9, first, the CPU 108 acquires angular velocity information from the gyro sensor 70 of the imaging device body 12 and acquires lens position information from the lens position sensor 100 in Step 150 and the processing then proceeds to Step 152.

In Step 152, the CPU 108 calculates lens destination information by using the lens position information and the angular velocity information that are acquired in Step 150, and adjusts the position of the anti-vibration lens 94 by moving the anti-vibration lens 94 to a destination that is represented by the lens destination information. In a case where the position of the anti-vibration lens 94 is adjusted in this way, image blur is suppressed.

In the next step 154, the CPU 108 determines whether or not an end condition, which is a condition where the lens-side anti-vibration processing is to end, is satisfied. A condition where an instruction to end the lens-side anti-vibration processing is received by the receiving device 62 is used as one example of the end condition according to the lens-side anti-vibration processing. Further, a condition where a first predetermined time (for example, 60 sec.) has passed while an instruction is not received by the receiving device 62 after the lens-side anti-vibration processing starts to be performed is used as another example of the end condition according to the lens-side anti-vibration processing.

In a case where the end condition according to the lens-side anti-vibration processing is not satisfied in Step 154, the determination is negative and the processing proceeds to Step 150. In a case where the end condition according to the lens-side anti-vibration processing is satisfied in Step 154, the determination is positive and the lens-side anti-vibration processing ends.

Next, the body-side anti-vibration processing, which is performed by the CPU 74 of the imaging device body 12 in a case where the power supply of the imaging device 10 is turned on (power is supplied to the imaging device 10) in a state where the imaging lens 14 is connected to the imaging device body 12 through the mounts 13 and 15, will be described with reference to FIG. 10.

Figure 10:
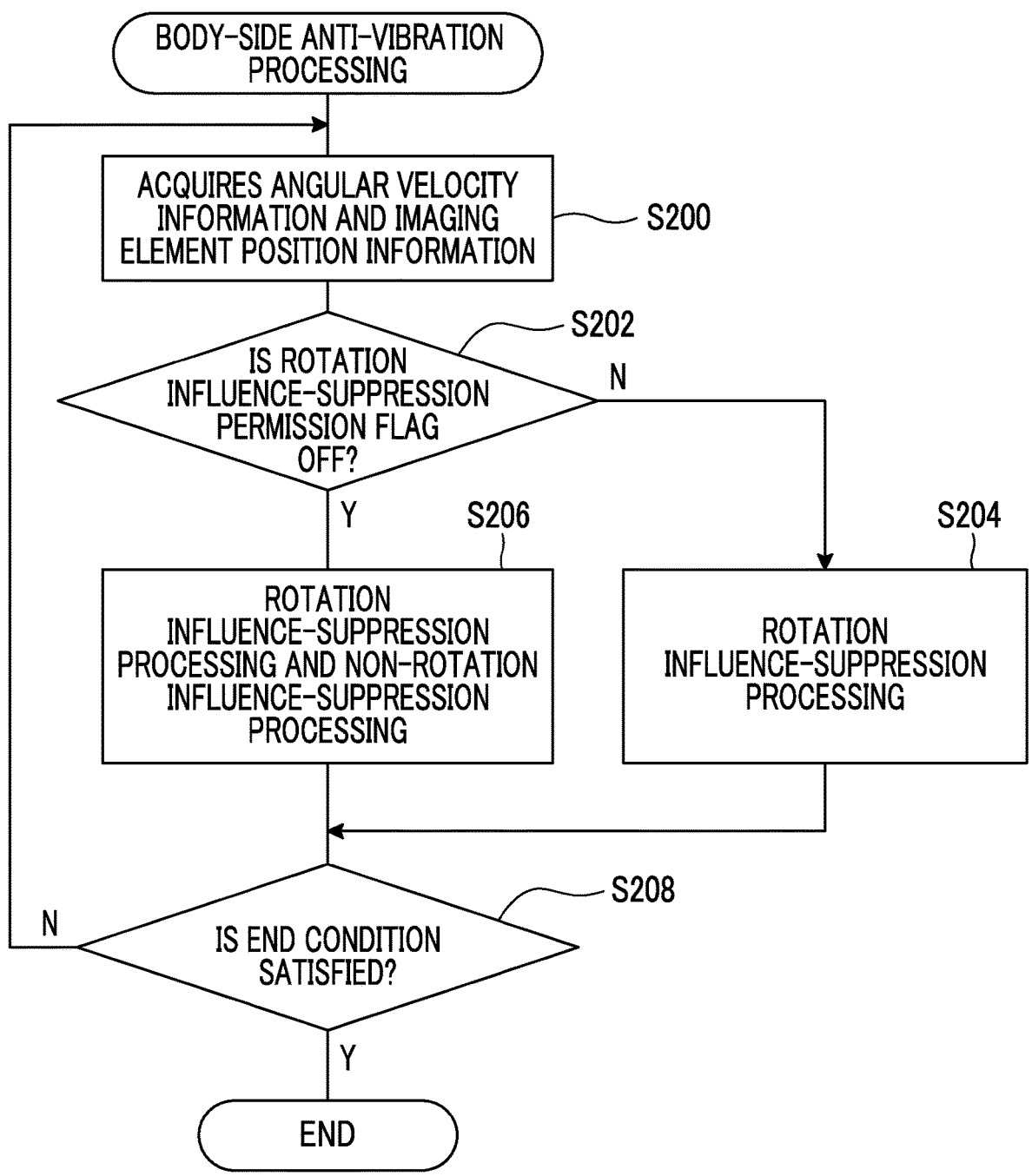
FIG. 10 is a flowchart showing an example of the flow of body-side anti-vibration processing according to the first to sixth embodiments.

In the body-side anti-vibration processing shown in FIG. 10, first, the CPU 74 acquires angular velocity information from the gyro sensor 70 and acquires imaging element-position information from the imaging element-position sensor 82 in Step 200 and the processing then proceeds to Step 202.

In Step 202, the CPU 74 determines whether or not a rotation influence-suppression permission flag, which is a flag permitting the BIS drive unit 80 to perform only the rotation influence-suppression processing, is off. Limit setting processing to be described later is performed, so that the rotation influence-suppression permission flag is caused to be on or off.

In a case where the rotation influence-suppression permission flag is on in Step 202, the determination is negative and the processing proceeds to Step 204. In a case where the rotation influence-suppression permission flag is off in Step 202, the determination is positive and the processing proceeds to Step 206.

The CPU 74 causes the BIS drive unit 80 to perform only the rotation influence-suppression processing in Step 204, and the processing then proceeds to Step 208.

The CPU 74 causes the BIS drive unit 80 to perform the rotation influence-suppression processing and the non-rotation influence-suppression processing in Step 206, and the processing then proceeds to Step 208. Since the processing of Step 206 is performed, the BIS drive unit 80 moves the imaging element 22 straight within an allowable stroke that is a stroke allowed as a stroke causing the imaging element 22 to move straight in a case where the BIS drive unit 80 is to perform the non-rotation influence-suppression processing. Limit setting processing to be described later is performed, so that the allowable stroke is determined.

In Step 208, the CPU 74 determines whether or not an end condition, which is a condition where the body-side anti-vibration processing is to end, is satisfied. A condition where an instruction to end the body-side anti-vibration processing is received by the receiving device 62 is used as one example of the end condition according to the body-side anti-vibration processing. Further, a condition where a second predetermined time (for example, 60 sec.) has passed while an instruction is not received by the receiving device 62 after the body-side anti-vibration processing starts to be performed is used as another example of the end condition according to the body-side anti-vibration processing.

In a case where the end condition according to the body-side anti-vibration processing is not satisfied in Step 208, the determination is negative and the processing proceeds to Step 200. In a case where the end condition according to the body-side anti-vibration processing is satisfied in Step 208, the determination is positive and the body-side anti-vibration processing ends.

Next, the limit setting processing, which is performed by the CPU 74 of the imaging device body 12 in a case where the power supply of the imaging device 10 is turned on (power is supplied to the imaging device 10) in a state where the imaging lens 14 is connected to the imaging device body 12 through the mounts 13 and 15, will be described with reference to FIG. 11. For the convenience of description, a full stroke is set as the allowable stroke as a default here on the premise that the limit setting processing starts to be performed. The full stroke refers to the maximum stroke that can cause the imaging element 22 to move straight in the first predetermined plane. Further, for the convenience of description, a case where the limit setting processing starts to be performed in a state where the rotation influence-suppression permission flag is off as a default will be described here.

Figure 11:
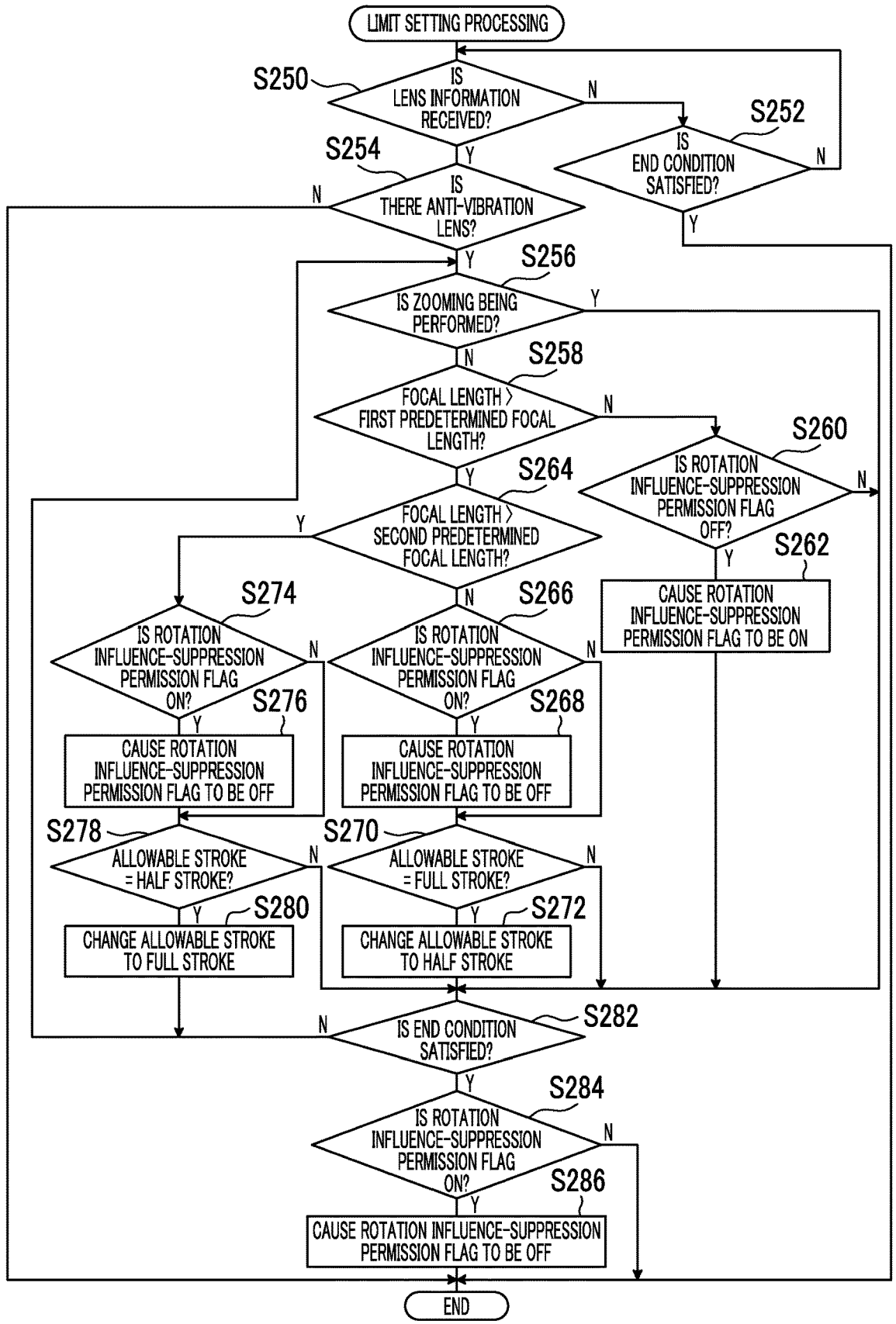
FIG. 11 is a flowchart showing an example of the flow of limit setting processing according to the first embodiment.

In the limit setting processing shown in FIG. 11, first, in Step 250, the CPU 74 determines whether or not the lens information 130 is received by the external I/F 72. In a case where the lens information 130 is not received by the external I/F 72 in Step 250, the determination is negative and the processing proceeds to Step 252. In a case where the lens information 130 is received by the external I/F 72 in Step 250, the determination is positive and the processing proceeds to Step 254.

In Step 252, the CPU 74 determines whether or not an end condition, which is a condition where the limit setting processing is to end, is satisfied. A condition where an instruction to end the limit setting processing is received by the receiving device 62 is used as one example of the end condition according to the limit setting processing. Further, a condition where a third predetermined time (for example, 60 sec.) has passed while an instruction is not received by the receiving device 62 after the limit setting processing starts to be performed is used as another example of the end condition according to the limit setting processing.

In a case where the end condition according to the limit setting processing is not satisfied in Step 252, the determination is negative and the processing proceeds to Step 250. In a case where the end condition according to the limit setting processing is satisfied in Step 252, the determination is positive and the limit setting processing ends.

In Step 254, the CPU 74 determines whether or not the imaging lens 14 includes the anti-vibration lens 94 with reference to the anti-vibration lens-presence/absence information 130A that is included in the lens information 130 received by the external I/F 72 in Step 250. In a case where the imaging lens 14 includes the anti-vibration lens 94 in Step 254, the determination is positive and the processing proceeds to Step 256.

In a case where the imaging lens 14 does not include the anti-vibration lens 94 in Step 254, the determination is negative and the limit setting processing ends. In this case, since the full stroke is employed as the allowable stroke in Step 206 shown in FIG. 10, the straight movement of the imaging element 22 caused by the non-rotation influence-suppression processing is performed within the full stroke.

In Step 256, the CPU 74 determines whether or not zooming is being performed. Here, since a state where zooming is being performed is, for example, a state where the zoom lens 92 is being moved, the state where zooming is being performed means a state where a focal length is not yet determined.

In a case where zooming is being performed in Step 256, the determination is positive and the processing proceeds to Step 282. In a case where zooming is not being performed in Step 256, the determination is negative and the processing proceeds to Step 258.

In Step 258, the CPU 74 determines whether or not a focal length included in the lens information 130 acquired in Step 250 exceeds a first predetermined focal length. The first predetermined focal length is an example of a first threshold value according to the technique of the disclosure.

The first predetermined focal length is a focal length that is derived in advance from a sensory test and/or a computer simulation, or the like as an upper limit of a focal length where the deterioration of image quality caused by peripheral optical characteristics is not perceived visually in a case where only the rotation influence-suppression processing of the influence-suppression processing is performed. Here, the peripheral optical characteristics refer to, for example, the amount of ambient light and/or vignetting.

60 mm is employed in Step 258 as an example of the first predetermined focal length, but the technique of the disclosure is not limited thereto. A distance other than 60 mm may be employed as an example of the first predetermined focal length as long as being in a predetermined range shorter than a second predetermined focal length to be described later.

In a case where a focal length is equal to or shorter than the first predetermined focal length in Step 258, the determination is negative and the processing proceeds to Step 260. In a case where a focal length exceeds the first predetermined focal length in Step 258, the determination is positive and the processing proceeds to Step 264.

In Step 260, the CPU 74 determines whether or not the rotation influence-suppression permission flag is off. In a case where the rotation influence-suppression permission flag is on in Step 260, the determination is negative and the processing proceeds to Step 282. In a case where the rotation influence-suppression permission flag is off in Step 260, the determination is positive and the processing proceeds to Step 262.

The CPU 74 causes the rotation influence-suppression permission flag to be on in Step 262, and the processing then proceeds to Step 282.

In Step 264, the CPU 74 determines whether or not a focal length included in the lens information 130 acquired in Step 250 exceeds a second predetermined focal length. The second predetermined focal length is an example of a second threshold value according to the technique of the disclosure.

The second predetermined focal length is a focal length that is known in advance from a sensory test and/or a computer simulation, or the like as an upper limit of a focal length where the deterioration of image quality caused by peripheral optical characteristics is not perceived visually in a case where the non-rotation influence-suppression processing with a half stroke is performed. Here, the half stroke refers to a half of the full stroke.

100 mm is employed in Step 264 as an example of the second predetermined focal length, but the technique of the disclosure is not limited thereto. A distance other than 100 mm may be employed as an example of the second predetermined focal length as long as being in a predetermined range exceeding the first predetermined focal length.

In a case where a focal length is equal to or shorter than the second predetermined focal length in Step 264, the determination is negative and the processing proceeds to Step 266. In a case where a focal length exceeds the second predetermined focal length in Step 264, the determination is positive and the processing proceeds to Step 274.

In Step 266, the CPU 74 determines whether or not the rotation influence-suppression permission flag is on. In a case where the rotation influence-suppression permission flag is on in Step 266, the determination is positive and the processing proceeds to Step 268. In a case where the rotation influence-suppression permission flag is off in Step 266, the determination is negative and the processing proceeds to Step 270.

The CPU 74 causes the rotation influence-suppression permission flag to be off in Step 268, and the processing then proceeds to Step 270.

In Step 270, the CPU 74 determines whether or not the full stroke is employed as the current allowable stroke. In a case where the full stroke is employed as the current allowable stroke in Step 270, the determination is positive and the processing proceeds to Step 272. In a case where the half stroke is employed as the current allowable stroke in Step 270, the determination is negative and the processing proceeds to Step 282.

The CPU 74 changes the allowable stroke to the half stroke from the full stroke in Step 272, and the processing then proceeds to Step 282. In a case where the allowable stroke is changed to the half stroke from the full stroke as described above, the straight movement of the imaging element 22 caused by the non-rotation influence-suppression processing is performed within the half stroke in Step 206 shown in FIG. 10.

In Step 274, the CPU 74 determines whether or not the rotation influence-suppression permission flag is on. In a case where the rotation influence-suppression permission flag is on in Step 274, the determination is positive and the processing proceeds to Step 276. In a case where the rotation influence-suppression permission flag is off in Step 274, the determination is negative and the processing proceeds to Step 278.

The CPU 74 causes the rotation influence-suppression permission flag to be off in Step 276, and the processing then proceeds to Step 278.

In Step 278, the CPU 74 determines whether or not the half stroke is employed as the current allowable stroke. In a case where the half stroke is employed as the current allowable stroke in Step 278, the determination is positive and the processing proceeds to Step 280. In a case where the full stroke is employed as the current allowable stroke in Step 278, the determination is negative and the processing proceeds to Step 282.

The CPU 74 changes the allowable stroke to the full stroke from the half stroke in Step 280, and the processing then proceeds to Step 256. In a case where the allowable stroke is changed to the full stroke from the half stroke as described above, the straight movement of the imaging element 22 caused by the non-rotation influence-suppression processing is performed within the full stroke in Step 206 shown in FIG. 10.

As the focal length is longer, the degree of image blur is increased but it is difficult for the deterioration of image quality caused by peripheral optical characteristics to occur. Accordingly, the reason why the allowable stroke is changed to the full stroke in Step 280 is to increase the movable range of the imaging element 22. Since the allowable stroke is changed to the full stroke from the half stroke as described above, the movable range of the imaging element 22 is larger than that in a case where the allowable stroke is the half stroke. Accordingly, image blur is suppressed.

In contrast, as the focal length is shorter, the deterioration of image quality caused by peripheral optical characteristics is likely to occur. Accordingly, the reason why the allowable stroke is changed to the half stroke in Step 272 is to reduce the movable range of the imaging element 22. Since the allowable stroke is changed to the half stroke from the full stroke as described above, the movable range of the imaging element 22 is smaller than that in a case where the allowable stroke is the full stroke. Accordingly, the deterioration of image quality caused by peripheral optical characteristics is suppressed.

In Step 282, the CPU 74 determines whether or not the end condition according to the above-mentioned limit setting processing is satisfied. In a case where the end condition according to the limit setting processing is not satisfied in Step 282, the determination is negative and the processing proceeds to Step 256. In a case where the end condition according to the limit setting processing is satisfied in Step 282, the determination is positive and the processing proceeds to Step 284.

In Step 284, the CPU 74 determines whether or not the rotation influence-suppression permission flag is on. In a case where the rotation influence-suppression permission flag is on in Step 284, the determination is positive and the processing proceeds to Step 286. In a case where the rotation influence-suppression permission flag is off in Step 284, the determination is negative and the limit setting processing ends.

The CPU 74 causes the rotation influence-suppression permission flag to be off in Step 286, and then ends the limit setting processing.

As described above, control suppressing a blurring influence with a limit determined according to the lens information 130 is performed on the BIS drive unit 80 in the imaging device 10. Therefore, according to the imaging device 10, the deterioration of image quality, which is caused by the interchange of the imaging lens 14, can be suppressed as compared to a case where a degree for limiting the suppression of a blurring influence is fixed.

Further, in the imaging device 10, control suppressing a blurring influence with the minimum limit is performed on the BIS drive unit 80 in a case where the imaging lens 14 includes the anti-vibration lens 94. That is, in Step 206 of the body-side anti-vibration processing shown in FIG. 10, the rotation influence-suppression processing is performed and the non-rotation influence-suppression processing is performed with the full stroke. Therefore, according to the imaging device 10, a blurring influence can be suppressed as compared to a case where a limit is not minimum despite a state where image quality does not deteriorate even though the limit is minimum.

Furthermore, control causing the BIS drive unit 80 to perform only the rotation influence-suppression processing and control causing the BIS drive unit 80 to perform the rotation influence-suppression processing and the non-rotation influence-suppression processing are selectively performed in the imaging device 10 according to the lens information 130 by the BIS drive unit 80. Therefore, according to the imaging device 10, both a blurring influence and the deterioration of image quality to be caused by the interchange of the imaging lens 14 can be suppressed as compared to a case where only the rotation influence-suppression processing is always performed and a case where only the non-rotation influence-suppression processing is always performed.

Further, a limit is determined in the imaging device 10 according to a local length (see Steps 258 to 280 shown in FIG. 11). Therefore, according to the imaging device 10, both a blurring influence and the deterioration of image quality to be caused by the interchange of the imaging lens 14 can be suppressed as compared to a case where a limit is fixed despite a change in a focal length.

Furthermore, in a case where a focal length is equal to or shorter than the first predetermined focal length, the CPU 74 causes the BIS drive unit 80 to perform only the rotation influence-suppression processing in the imaging device 10. Moreover, in a case where a focal length exceeds the first predetermined focal length, the CPU 74 causes the BIS drive unit 80 to perform the rotation influence-suppression processing and the non-rotation influence-suppression processing in the imaging device 10. Therefore, according to the imaging device 10, both a blurring influence and the deterioration of image quality to be caused by the interchange of the imaging lens 14 can be suppressed as compared to a case where the suppression of a blurring influence is always limited with a constant limit despite a change in a focal length.

Further, in a case where a focal length exceeds the first predetermined focal length and is equal to or shorter than the second predetermined focal length, the non-rotation influence-suppression processing is performed within the half stroke in the imaging device 10. Furthermore, in a case where a focal length exceeds the second predetermined focal length, the non-rotation influence-suppression processing is performed within the full stroke in the imaging device 10. Therefore, according to the imaging device 10, both a blurring influence and the deterioration of image quality to be caused by the interchange of the imaging lens 14 can be suppressed as compared to a case where the non-rotation influence-suppression processing is performed in a state where straight movement with the full stroke is always allowed despite a change in a focal length.

Moreover, in the imaging device 10, a limit is determined according to a focal length on the premise that zooming is being performed. Therefore, according to the imaging device 10, it is possible to avoid a case where the suppression of a blurring influence is limited with a limit determined according to a focal length not suitable for the current state.

An example where the allowable stroke is changed to the half stroke from the full stroke in Step 272 has been described in the first embodiment, but the technique of the disclosure is not limited thereto. For example, the allowable stroke may be changed to ⅔ stroke, ¼ stroke, or the like from the full stroke in Step 272. That is, a stroke may be changed according to a focal length or the like in Step 272 so that the non-rotation influence-suppression processing is performed in a state where straight movement with the full stroke is prevented.

Further, a case where the rotation influence-suppression processing and the non-rotation influence-suppression processing are performed in Step 206 shown in FIG. 10 has been described in the first embodiment, but the technique of the disclosure is not limited thereto. For example, only the non-rotation influence-suppression processing may be performed in Step 206 shown in FIG. 10.

Furthermore, the gyro sensor 70 has been exemplified in the first embodiment, but the technique of the disclosure is not limited thereto. An acceleration sensor may be used instead of the gyro sensor 70. Moreover, the gyro sensor 70 and an acceleration sensor may be used together. As described above, any sensor may be used as long as functioning as a detection unit for detecting vibration applied to the imaging device 10.

Second Embodiment

A case where a limit is determined regardless of the type of operating mode and a subject distance has been described in the first embodiment, but a case where a limit is determined according to the type of operating mode and a subject distance will be described in a second embodiment. In the second embodiment, the same components as the components described in the first embodiment will be denoted by the same reference numerals as those of the first embodiment and the description thereof will be omitted.

As shown in, for example, FIGS. 1 to 4, an imaging device 10A according to the second embodiment is different from the imaging device 10 according to the first embodiment in that the imaging device 10A includes an imaging device body 12A instead of the imaging device body 12.

As shown in, for example, FIG. 3, the imaging device body 12A is different from the imaging device body 12 in that the imaging device body 12A includes a body-side main controller 46A instead of the body-side main controller 46. The body-side main controller 46A is different from the body-side main controller 46 in that the body-side main controller 46A includes a secondary storage unit 78A instead of the secondary storage unit 78.

As shown in, for example, FIG. 6, the secondary storage unit 78A is different from the secondary storage unit 78 in that the secondary storage unit 78A stores a limit setting program 136A instead of the limit setting program 136. The CPU 74 reads the limit setting program 136A from the secondary storage unit 78A, develops the limit setting program 136A in the primary storage unit 76, and performs limit setting processing shown in FIGS. 12 and 13 according to the developed limit setting program 136A. In other words, the CPU 74 operates as a control unit according to the technique of the disclosure by executing the limit setting program 136A.

Next, the limit setting processing shown in FIGS. 12 and 13 will be described as the actions of parts of the imaging device 10A according to the technique of the disclosure. The description of the same actions as the actions of the first embodiment will be omitted.

Figure 12:
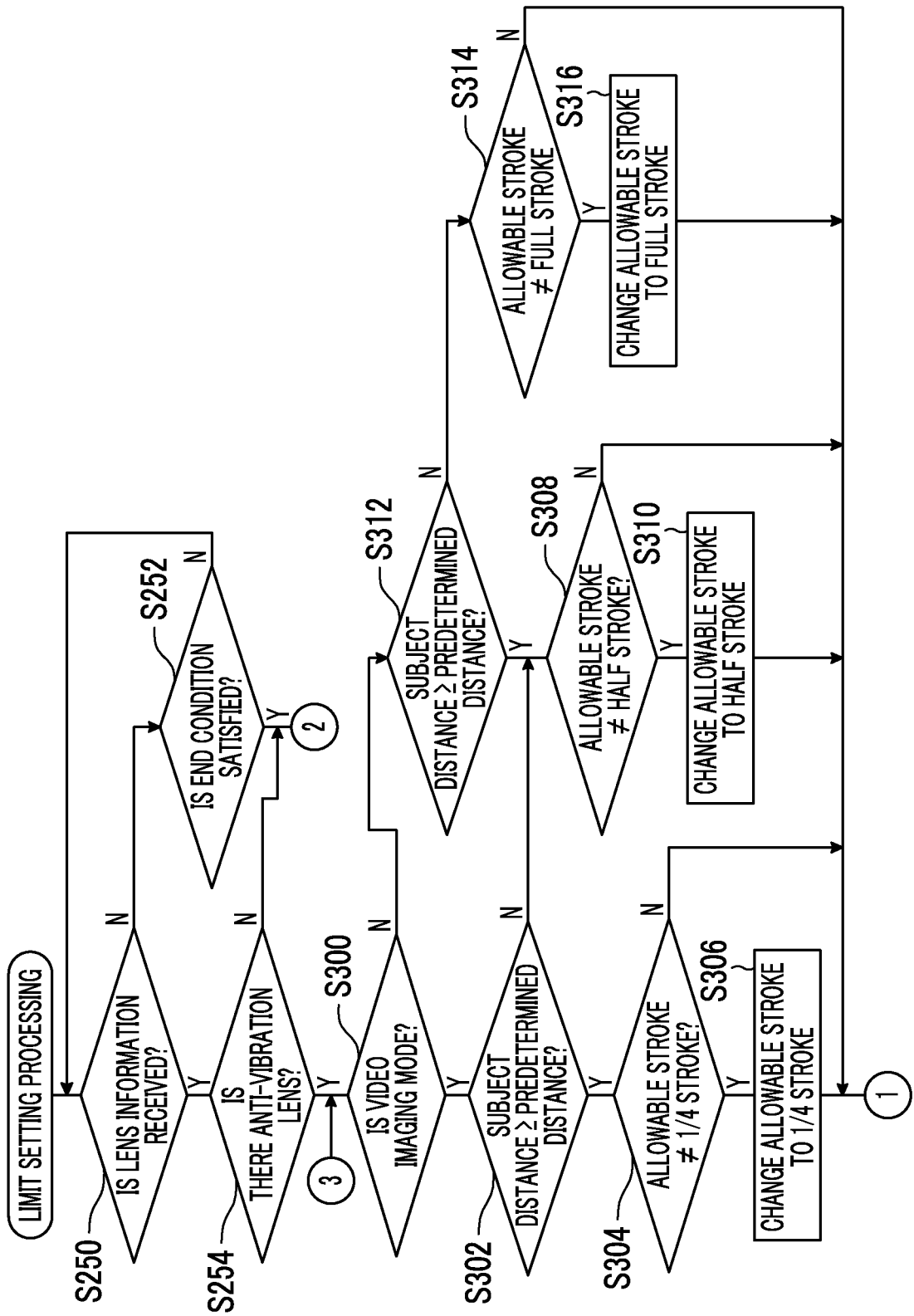
FIG. 12 is a flowchart showing an example of the flow of limit setting processing according to the second, fourth, and sixth embodiments.
Figure 13:
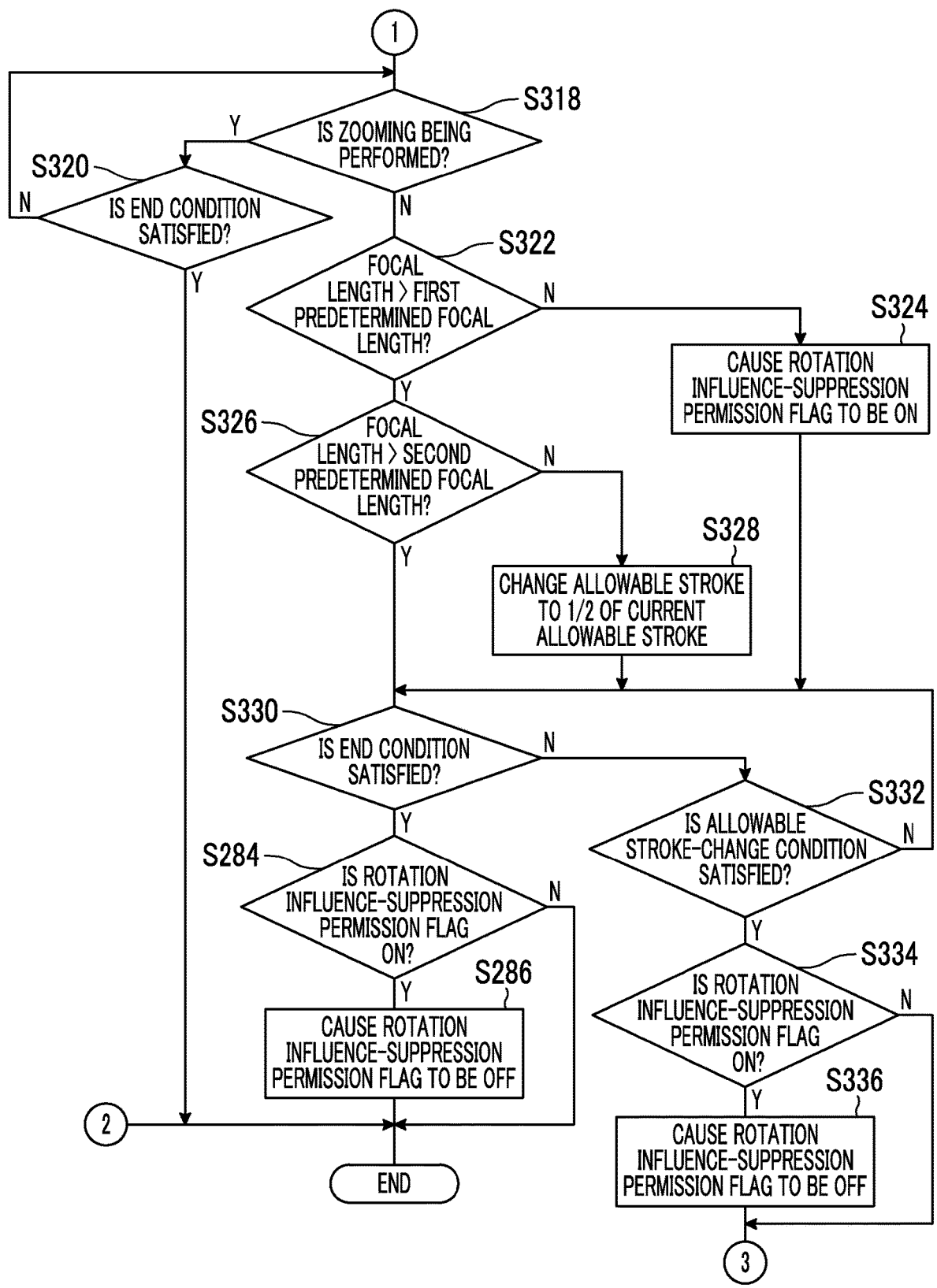
FIG. 13 is a flowchart showing an example of the flow of limit setting processing according to the second embodiment, and is a continuation of the flowchart shown in FIG. 12.

The limit setting processing shown in FIGS. 12 and 13 is performed by the CPU 74 of the imaging device body 12A in a case where the power supply of the imaging device 10A is turned on (power is supplied to the imaging device 10A) in a state where the imaging lens 14 is connected to the imaging device body 12A through the mounts 13 and 15. In the following description, the same steps as the steps of the flowchart shown in FIG. 11 will be denoted by the same step numbers as those of the flowchart and the description thereof will be omitted.

For the convenience of description, a full stroke is set as the allowable stroke here on the premise that the limit setting processing starts to be performed. Further, for the convenience of description, the rotation influence-suppression permission flag is caused to be off here on the premise that the limit setting processing starts to be performed. Furthermore, for the convenience of description, description will be made here on the premise that any one of the video imaging mode and the static image taking mode is set as the operating mode.

The limit setting processing shown in FIGS. 12 and 13 is different from the limit setting processing shown in FIG. 11 in that the limit setting processing shown in FIGS. 12 and 13 includes Steps 300 to 336 instead of Steps 256 to 282.

In Step 300 shown in FIG. 12, the CPU 74 determines whether or not a currently set operating mode is the video imaging mode. In a case where the currently set operating mode is the static image taking mode in Step 300, the determination is negative and the processing proceeds to Step 312. In a case where the currently set operating mode is the video imaging mode in Step 300, the determination is positive and the processing proceeds to Step 302.

Incidentally, as a subject distance, which is a distance between the imaging device 10A and a subject, is longer, a blurring influence is reduced. Then, processing of Steps 302 to 316 is performed, so that an allowable stroke corresponding to the subject distance is determined.

In Step 302, the CPU 74 determines whether or not the subject distance is equal to or longer than a predetermined distance. The subject distance may be measured by a distance-measuring device (not shown) or the like, or may be input through the receiving device 62 by a user.

In Step 302, the CPU 74 determines whether or not the subject distance is equal to or longer than the predetermined distance. The predetermined distance is a subject distance that is known in advance from a sensory test and/or a computer simulation, or the like as a lower limit of a subject distance where image blur is visually perceived. Here, 1 meter is employed as an example of the predetermined distance.

In a case where the subject distance is equal to or longer than the predetermined distance in Step 302, the determination is positive and the processing proceeds to Step 304. In a case where the subject distance is shorter than the predetermined distance in Step 302, the determination is negative and the processing proceeds to Step 308.

In Step 304, the CPU 74 determines whether or not the current allowable stroke is ¼ stroke. ¼ stroke refers to a quarter of the full stroke.

In a case where a stroke other than ¼ stroke is employed as the current allowable stroke in Step 304, the determination is positive and the processing proceeds to Step 306. In a case where ¼ stroke is employed as the current allowable stroke in Step 304, the determination is negative and the processing proceeds to Step 318 shown in FIG. 13.

The CPU 74 changes the allowable stroke to ¼ stroke from a stroke other than ¼ stroke in Step 306, and the processing then proceeds to Step 318 shown in FIG. 13. In a case where the allowable stroke is changed to ¼ stroke from a stroke other than ¼ stroke as described above, the straight movement of the imaging element 22 caused by the non-rotation influence-suppression processing is performed within ¼ stroke in Step 206 shown in FIG. 10.

In Step 308, the CPU 74 determines whether or not the current allowable stroke is the half stroke. In a case where a stroke other than the half stroke is employed as the current allowable stroke in Step 308, the determination is positive and the processing proceeds to Step 310. In a case where the half stroke is employed as the current allowable stroke in Step 308, the determination is negative and the processing proceeds to Step 318 shown in FIG. 13.

The CPU 74 changes the allowable stroke to the half stroke from a stroke other than the half stroke in Step 310, and the processing then proceeds to Step 318 shown in FIG. 13. In a case where the allowable stroke is changed to the half stroke from a stroke other than the half stroke as described above, the straight movement of the imaging element 22 caused by the non-rotation influence-suppression processing is performed within the half stroke in Step 206 shown in FIG. 10.

In Step 312, the CPU 74 determines whether or not the subject distance is equal to or longer than a predetermined distance. In a case where the subject distance is equal to or longer than the predetermined distance in Step 312, the determination is positive and the processing proceeds to Step 308. In a case where the subject distance is shorter than the predetermined distance in Step 312, the determination is negative and the processing proceeds to Step 314.

In Step 314, the CPU 74 determines whether or not the current allowable stroke is the full stroke. In a case where a stroke other than the full stroke, that is, a stroke shorter than the full stroke is employed as the current allowable stroke in Step 314, the determination is positive and the processing proceeds to Step 316. In a case where the full stroke is employed as the current allowable stroke in Step 314, the determination is negative and the processing proceeds to Step 318 shown in FIG. 13.

In Step 318 shown in FIG. 13, the CPU 74 determines whether or not zooming is being performed. In a case where zooming is not being performed in Step 318, the determination is negative and the processing proceeds to Step 320. In a case where zooming is being performed in Step 318, the determination is positive and the processing proceeds to Step 322.

In Step 320, the CPU 74 determines whether or not the end condition according to the above-mentioned limit setting processing is satisfied. In a case where the end condition according to the limit setting processing is not satisfied in Step 320, the determination is negative and the processing proceeds to Step 318. In a case where the end condition according to the limit setting processing is satisfied in Step 320, the determination is positive and the limit setting processing ends.

In Step 322, the CPU 74 determines whether or not a focal length exceeds the first predetermined focal length. In a case where a focal length is equal to or shorter than the first predetermined focal length in Step 322, the determination is negative and the processing proceeds to Step 324. In a case where a focal length exceeds the first predetermined focal length in Step 322, the determination is positive and the processing proceeds to Step 326.

The CPU 74 causes the rotation influence-suppression permission flag to be on in Step 324, and the processing then proceeds to Step 330.

In Step 326, the CPU 74 determines whether or not the focal length exceeds the second predetermined focal length. In a case where a focal length is equal to or shorter than the second predetermined focal length in Step 326, the determination is negative and the processing proceeds to Step 328. In a case where a focal length exceeds the second predetermined focal length in Step 326, the determination is positive and the processing proceeds to Step 330.

The CPU 74 changes the allowable stroke to ½ of the current allowable stroke in Step 328, and the processing then proceeds to Step 330. In Step 328, the allowable stroke is changed to ⅛ stroke, which is a half of ¼ stroke, from ¼ stroke in a case where, for example, the current allowable stroke is ¼ stroke. Further, the allowable stroke is changed to ¼ stroke from the half stroke in a case where, for example, the current allowable stroke is the half stroke. Furthermore, the allowable stroke is changed to the half stroke from the full stroke in a case where, for example, the current allowable stroke is the full stroke.

In Step 330, the CPU 74 determines whether or not the end condition according to the above-mentioned limit setting processing is satisfied. In a case where the end condition according to the limit setting processing is not satisfied in Step 330, the determination is negative and the processing proceeds to Step 332. In a case where the end condition according to the limit setting processing is satisfied in Step 330, the determination is positive and the processing proceeds to Step 284.

In Step 332, the CPU 74 determines whether or not an allowable stroke-change condition, which is a condition where the allowable stroke is to be changed, is satisfied. The allowable stroke-change condition refers to, for example, a condition where a combination of an operating mode, a subject distance, and a focal length is a combination leading to an allowable stroke different from the current allowable stroke. In a case where for example, an operating mode is not changed but a subject distance and a focal length are changed so that an allowable stroke different from the current allowable stroke can be led, the allowable stroke-change condition is satisfied.

In a case where the allowable stroke-change condition is satisfied in Step 332, the determination is positive and the processing proceeds to Step 334. In a case where the allowable stroke-change condition is not satisfied in Step 332, the determination is negative and the processing proceeds to Step 330.

In Step 334, the CPU 74 determines whether or not the rotation influence-suppression permission flag is on. In a case where the rotation influence-suppression permission flag is on in Step 334, the determination is positive and the processing proceeds to Step 336. In a case where the rotation influence-suppression permission flag is off in Step 334, the determination is negative and the processing proceeds to Step 300 shown in FIG. 12.

The CPU 74 causes the rotation influence-suppression permission flag to be off in Step 336, and the processing then proceeds to Step 300 shown in FIG. 12.

As described above, in the imaging device 10A, an allowable stroke is shortened as a subject distance is lengthened (see Steps 302 to 316). As a result, a limit is increased. Therefore, according to the imaging device 10A, both a blurring influence and the deterioration of image quality to be caused by the interchange of the imaging lens 14 can be suppressed as compared to a case where a limit is fixed despite a change in a subject distance.

Further, in the imaging device 10A, an allowable stroke is shortened (see Steps 300 to 316) in a case where the video imaging mode is set as compared to a case where the static image taking mode is set. As a result, the deterioration of image quality to be caused by the interchange of the imaging lens 14 can be suppressed.

A case where any one of the video imaging mode and the static image taking mode is set in the limit setting processing has been described in the second embodiment, but the technique of the disclosure is not limited thereto. For example, the processing of Steps 302 to 306 may be performed during the display of a live view image, and the processing of Steps 312 to 316 may be performed in the case of the half-pressed state of the release button 26 or the case of the fully-pressed state of the release button 26 in the static image taking mode.

Further, a case where the allowable stroke is changed to ¼ stroke in Step 306, the allowable stroke is changed to the half stroke in Step 310, and the allowable stroke is changed to the full stroke in Step 316 has been described in the second embodiment, but the technique of the disclosure is not limited thereto. For example, the allowable strokes changed in Steps 306, 310, and 316 may be determined according to a subject distance and/or an operating mode, or the like so that a relationship of "the allowable stroke changed in Step 306<the allowable stroke changed in Step 310<the allowable stroke changed in Step 316" is satisfied.

Furthermore, a case where the allowable stroke is changed to ½ of the current allowable stroke has been described in the second embodiment, but the technique of the disclosure is not limited thereto. For example, the allowable stroke may be changed to ⅓, ⅔. ¾, or the like of the current allowable stroke, or may be determined according to a focal length or the like so that the allowable stroke is shorter than the current allowable stroke.

Third Embodiment

A case where a limit is determined according to a focal length has been described in the first embodiment, but a case where a limit is determined according to the amount of ambient light will be described in a third embodiment. In the third embodiment, the same components as the components described in the first embodiment will be denoted by the same reference numerals as those of the first embodiment and the description thereof will be omitted.

As shown in, for example FIGS. 1 to 4, an imaging device 10B according to the third embodiment is different from the imaging device 10 according to the first embodiment in that the imaging device 10B includes an imaging device body 12B instead of the imaging device body 12.

As shown in, for example, FIG. 3, the imaging device body 12B is different from the imaging device body 12 in that the imaging device body 12B includes a body-side main controller 46B instead of the body-side main controller 46. The body-side main controller 46B is different from the body-side main controller 46 in that the body-side main controller 46B includes a secondary storage unit 78B instead of the secondary storage unit 78.

As shown in, for example, FIG. 6, the secondary storage unit 78B is different from the secondary storage unit 78 in that the secondary storage unit 78B stores a limit setting program 136B instead of the limit setting program 136. The CPU 74 reads the limit setting program 136B from the secondary storage unit 78B, develops the limit setting program 136B in the primary storage unit 76, and performs limit setting processing shown in FIG. 14 according to the developed limit setting program 136B. In other words, the CPU 74 operates as a control unit according to the technique of the disclosure by executing the limit setting program 136B.

Next, the limit setting processing shown in FIG. 14 will be described as the actions of parts of the imaging device 10B according to the technique of the disclosure. The description of the same actions as the actions of the first embodiment will be omitted.

Figure 14:
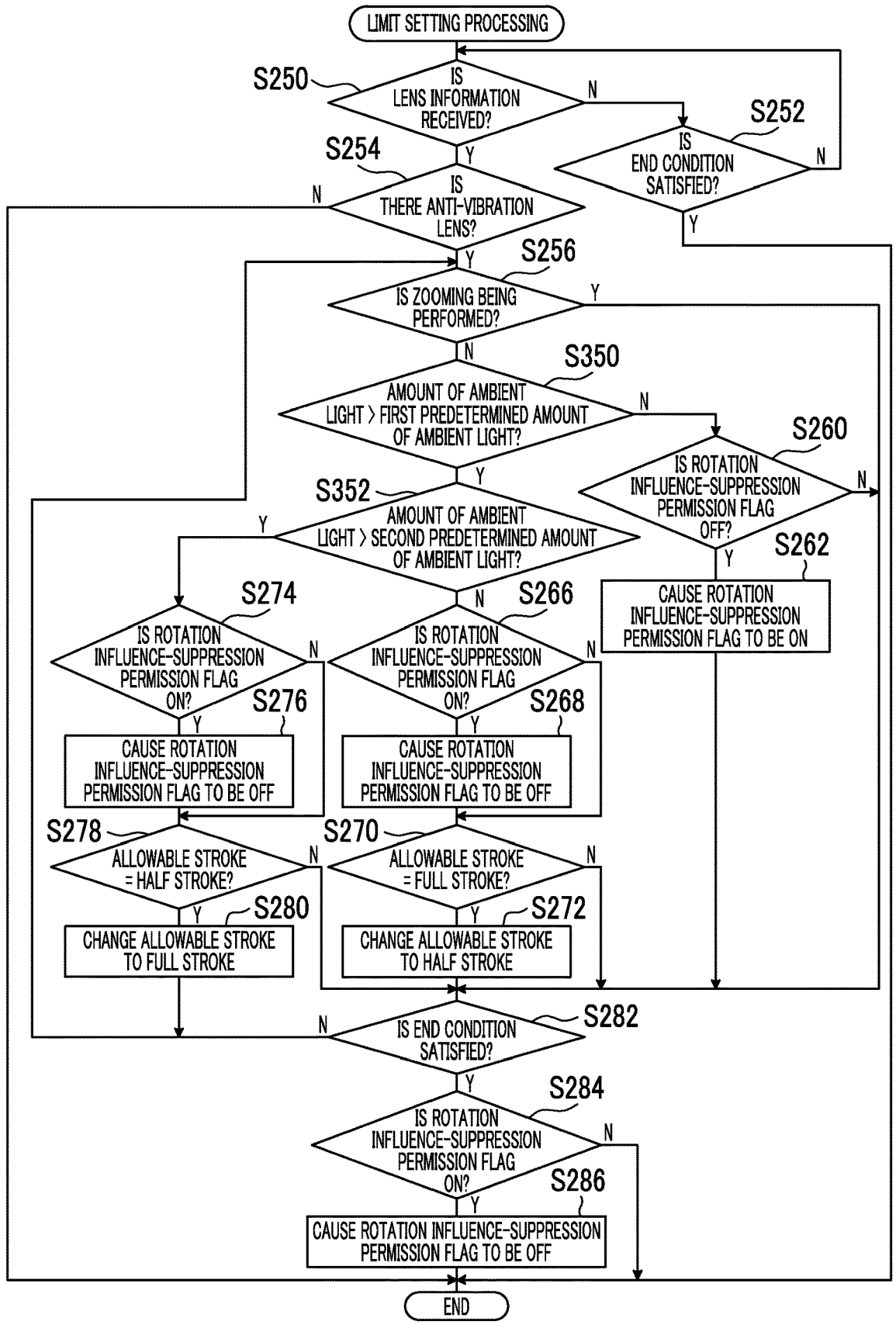
FIG. 14 is a flowchart showing an example of the flow of limit setting processing according to the third embodiment.

The limit setting processing shown in FIG. 14 is performed by the CPU 74 of the imaging device body 12B in a case where the power supply of the imaging device 10B is turned on (power is supplied to the imaging device 10B) in a state where the imaging lens 14 is connected to the imaging device body 12B through the mounts 13 and 15. In the following description, the same steps as the steps of the flowchart shown in FIG. 11 will be denoted by the same step numbers as those of the flowchart and the description thereof will be omitted.

The limit setting processing shown in FIG. 14 is different from the limit setting processing shown in FIG. 11 in that the limit setting processing shown in FIG. 14 includes Steps 350 and 352 instead of Steps 258 and 264.

In Step 350 shown in FIG. 14, the CPU 74 determines whether or not the amount of ambient light included in the lens information 130 acquired in Step 250 exceeds a first predetermined amount of ambient light. The first predetermined amount of ambient light is an example of a first threshold value according to the technique of the disclosure.

The first predetermined amount of ambient light is the amount of ambient light that is known in advance from a sensory test and/or a computer simulation, or the like as an upper limit of the amount of ambient light where the deterioration of image quality caused by peripheral optical characteristics is visually perceived in a case where the non-rotation influence-suppression processing with the half stroke is performed.

50% is employed in Step 350 as an example of the first predetermined amount of ambient light, but the technique of the disclosure is not limited thereto. The amount of light other than 50% may be employed as long as being in a predetermined range lower than a second predetermined amount of ambient light to be described later.

In a case where the amount of ambient light is equal to or smaller than the first predetermined amount of ambient light in Step 350, the determination is negative and the processing proceeds to Step 260. In a case where the amount of ambient light exceeds the first predetermined amount of ambient light in Step 350, the determination is positive and the processing proceeds to Step 352.

In Step 352, the CPU 74 determines whether or not the amount of ambient light included in the lens information 130 acquired in Step 250 exceeds a second predetermined amount of ambient light. The second predetermined amount of ambient light is an example of a second threshold value according to the technique of the disclosure.

The second predetermined amount of ambient light is the amount of ambient light that is known in advance from a sensory test and/or a computer simulation, or the like as an upper limit of the amount of ambient light where the deterioration of image quality caused by peripheral optical characteristics is visually not perceived in a case where the rotation influence-suppression processing with the half stroke is performed.

70% is employed in Step 352 as an example of the second predetermined amount of ambient light, but the technique of the disclosure is not limited thereto. The amount of light other than 70% may be employed as long as being in a predetermined range exceeding the first predetermined amount of ambient light.

In a case where the amount of ambient light is equal to or smaller than the second predetermined amount of ambient light in Step 352, the determination is negative and the processing proceeds to Step 266. In a case where a the amount of ambient light exceeds the second predetermined amount of ambient light in Step 352, the determination is positive and the processing proceeds to Step 274.

As described above, a limit is determined in the imaging device 10B according to the amount of ambient light. Therefore, according to the imaging device 10B, both a blurring influence and the deterioration of image quality to be caused by the interchange of the imaging lens 14 can be suppressed as compared to a case where a limit is fixed despite a change in the amount of ambient light.

Further, in a case where the amount of ambient light is equal to or smaller than the first predetermined amount of ambient light, the CPU 74 causes the BIS drive unit 80 to perform only the rotation influence-suppression processing in the imaging device 10B. Furthermore, in a case where the amount of ambient light exceeds the first predetermined amount of ambient light, the CPU 74 causes the BIS drive unit 80 to perform the rotation influence-suppression processing and the non-rotation influence-suppression processing in the imaging device 10B. Therefore, according to the imaging device 10B, both a blurring influence and the deterioration of image quality to be caused by the interchange of the imaging lens 14 can be suppressed as compared to a case where the suppression of a blurring influence is always limited with a constant limit despite a change in the amount of ambient light.

Moreover, in a case where the amount of ambient light exceeds the first predetermined amount of ambient light and is equal to or smaller than the second predetermined amount of ambient light (Step 352: N), the non-rotation influence-suppression processing is performed within the half stroke in the imaging device 10B. Further, in a case where a focal length exceeds the second predetermined amount of ambient light (Step 352: Y), the non-rotation influence-suppression processing is performed within the full stroke in the imaging device 10B. Therefore, according to the imaging device 10B, both a blurring influence and the deterioration of image quality to be caused by the interchange of the imaging lens 14 can be suppressed as compared to a case where the non-rotation influence-suppression processing is performed in a state where straight movement with the full stroke is always allowed despite a change in the amount of ambient light.

A case where a limit is determined according to the amount of ambient light has been described in the third embodiment, but the technique of the disclosure is not limited thereto. For example, a peripheral resolution may be used instead of the amount of ambient light. Further, both the amount of ambient light and a peripheral resolution may be used. A physical quantity other than the amount of ambient light may be used instead as long as representing the optical characteristics of the peripheral area of the lens unit 18 as described above.

Fourth Embodiment

A case where a limit is determined according to the type of operating mode and a subject distance in addition to a focal length has been described in the second embodiment, but a case where a limit is determined according to the type of operating mode and a subject distance in addition to the amount of ambient light will be described in a fourth embodiment. In the fourth embodiment, the same components as the components described in the first embodiment will be denoted by the same reference numerals as those of the first embodiment and the description thereof will be omitted.

As shown in, for example, FIGS. 1 to 4, an imaging device 10C according to the fourth embodiment is different from the imaging device 10 according to the first embodiment in that the imaging device 10C includes an imaging device body 12C instead of the imaging device body 12.

As shown in, for example, FIG. 3, the imaging device body 12C is different from the imaging device body 12 in that the imaging device body 12C includes a body-side main controller 46C instead of the body-side main controller 46. The body-side main controller 46C is different from the body-side main controller 46 in that the body-side main controller 46C includes a secondary storage unit 78C instead of the secondary storage unit 78.

As shown in, for example, FIG. 6, the secondary storage unit 78C is different from the secondary storage unit 78 in that the secondary storage unit 78C stores a limit setting program 136C instead of the limit setting program 136. The CPU 74 reads the limit setting program 136C from the secondary storage unit 78C, develops the limit setting program 136C in the primary storage unit 76, and performs limit setting processing shown in FIGS. 12 and 15 according to the developed limit setting program 136C. In other words, the CPU 74 operates as a control unit according to the technique of the disclosure by executing the limit setting program 136C.

Next, the limit setting processing shown in FIGS. 12 and 15 will be described as the actions of parts of the imaging device 10C according to the technique of the disclosure. The description of the same actions as the actions of the second embodiment will be omitted.

Figure 15:
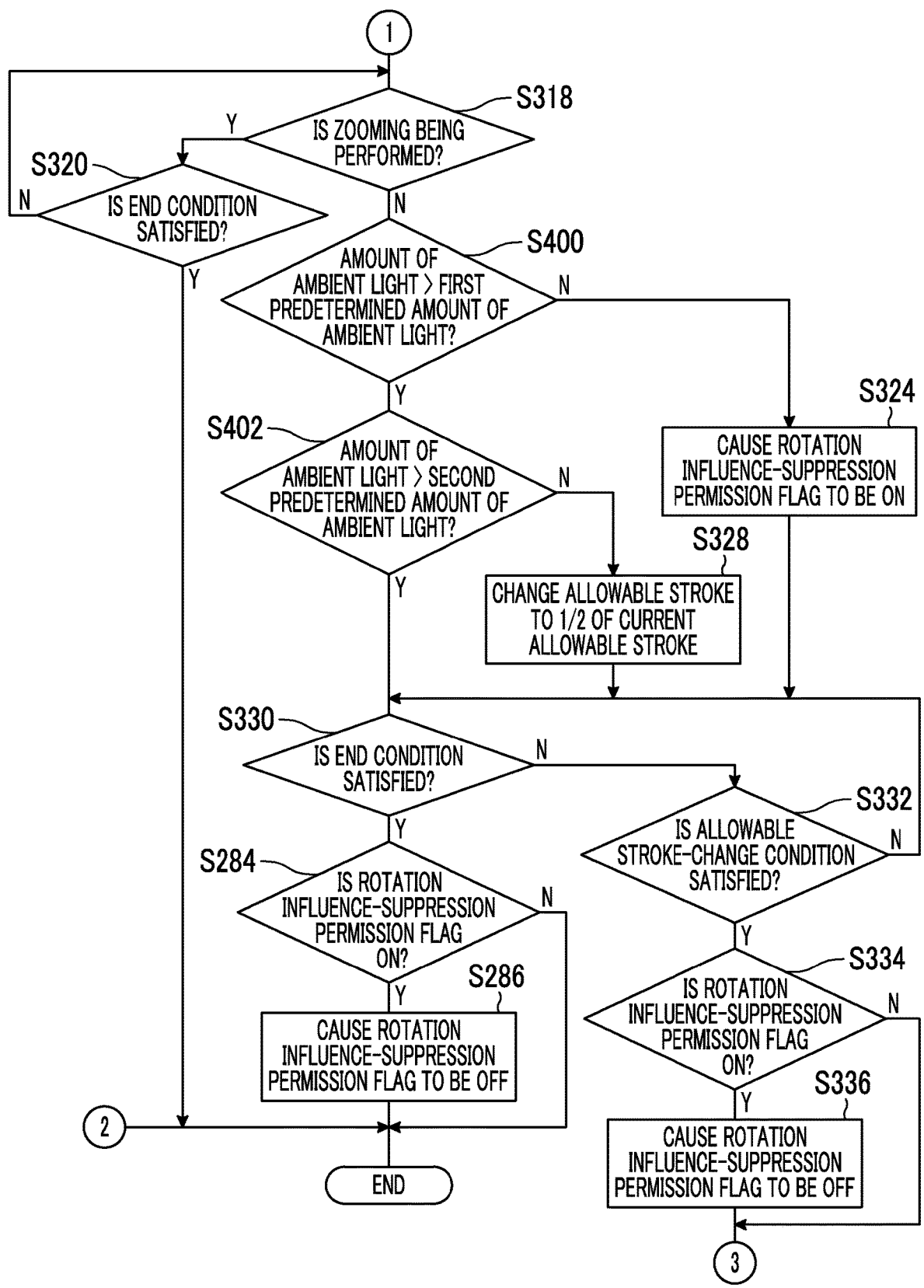
FIG. 15 is a flowchart showing an example of the flow of limit setting processing according to the fourth embodiment, and is a continuation of the flowchart shown in FIG. 12.

The limit setting processing shown in FIGS. 12 and 15 is performed by the CPU 74 of the imaging device body 12C in a case where the power supply of the imaging device 10C is turned on (power is supplied to the imaging device 10C) in a state where the imaging lens 14 is connected to the imaging device body 12C through the mounts 13 and 15. In the following description, the same steps as the steps of the flowchart shown in FIGS. 12 and 13 will be denoted by the same step numbers as those of the flowchart and the description thereof will be omitted.

The limit setting processing shown in FIGS. 12 and 15 is different from the limit setting processing shown in FIGS. 12 and 13 in that the limit setting processing shown in FIGS. 12 and 15 includes Steps 400 and 402 instead of Steps 322 and 326.

In Step 400 shown in FIG. 15, the CPU 74 determines whether or not the amount of ambient light included in the lens information 130 acquired in Step 250 exceeds the first predetermined amount of ambient light.

In a case where the amount of ambient light is equal to or smaller than the first predetermined amount of ambient light in Step 400, the determination is negative and the processing proceeds to Step 324. In a case where the amount of ambient light exceeds the first predetermined amount of ambient light in Step 400, the determination is positive and the processing proceeds to Step 402.

In Step 402, the CPU 74 determines whether or not the amount of ambient light included in the lens information 130 acquired in Step 250 exceeds the second predetermined amount of ambient light.

In a case where the amount of ambient light is equal to or smaller than the second predetermined amount of ambient light in Step 402, the determination is negative and the processing proceeds to Step 328. In a case where a focal length exceeds the second predetermined amount of ambient light in Step 402, the determination is positive and the processing proceeds to Step 330.

As described above, the processing of Steps 400 and 402 is performed in the imaging device 10C instead of the processing of Steps 322 and 326 included in the limit setting processing according to the second embodiment. Therefore, according to the imaging device 10C, the same effects as the effects of the imaging device 10A according to the second embodiment can be obtained even though a focal length is not used.

A case where the allowable stroke is changed to ½ of the current allowable stroke has been described in the fourth embodiment, but the technique of the disclosure is not limited thereto. For example, the allowable stroke may be changed to ⅓, ⅔, ¾, or the like of the current allowable stroke, or may be determined according to the amount of ambient light or the like so that the allowable stroke is shorter than the current allowable stroke.

Fifth Embodiment

A case where a limit is determined according to a focal length has been described in the first embodiment, and a case where a limit is determined according to the amount of ambient light has been described in the third embodiment. However, a case where a limit is determined according to a focal length and the amount of ambient light will be described in a fifth embodiment. In the fifth embodiment, the same components as the components described in the first embodiment will be denoted by the same reference numerals as those of the first embodiment and the description thereof will be omitted.

As shown in, for example, FIGS. 1 to 4, an imaging device 10D according to the fifth embodiment is different from the imaging device 10 according to the first embodiment in that the imaging device 10D includes an imaging device body 12D instead of the imaging device body 12.

As shown in, for example, FIG. 3, the imaging device body 12D is different from the imaging device body 12 in that the imaging device body 12D includes a body-side main controller 46D instead of the body-side main controller 46. The body-side main controller 46D is different from the body-side main controller 46 in that the body-side main controller 46D includes a secondary storage unit 78D instead of the secondary storage unit 78.

As shown in, for example, FIG. 6, the secondary storage unit 78D is different from the secondary storage unit 78 in that the secondary storage unit 78D stores a limit setting program 136D instead of the limit setting program 136. The CPU 74 reads the limit setting program 136D from the secondary storage unit 78D, develops the limit setting program 136D in the primary storage unit 76, and performs limit setting processing shown in FIGS. 16 to 20 according to the developed limit setting program 136D. In other words, the CPU 74 operates as a control unit according to the technique of the disclosure by executing the limit setting program 136D.

Next, the limit setting processing shown in FIGS. 16 to 20 will be described as the actions of parts of the imaging device 10D according to the technique of the disclosure. The description of the same actions as the actions of the first embodiment will be omitted.

The limit setting processing shown in FIGS. 16 to 20 is performed by the CPU 74 of the imaging device body 12D in a case where the power supply of the imaging device 10D is turned on (power is supplied to the imaging device 10D) in a state where the imaging lens 14 is connected to the imaging device body 12D through the mounts 13 and 15. In the following description, the same steps as the steps of the flowchart shown in FIG. 11 will be denoted by the same step numbers as those of the flowchart and the description thereof will be omitted.

The limit setting processing shown in FIGS. 16 to 20 is different from the limit setting processing shown in FIG. 11 in that the limit setting processing shown in FIGS. 16 to 20 includes Steps 446 to 480 instead of Steps 258 to 280.

Figure 16:
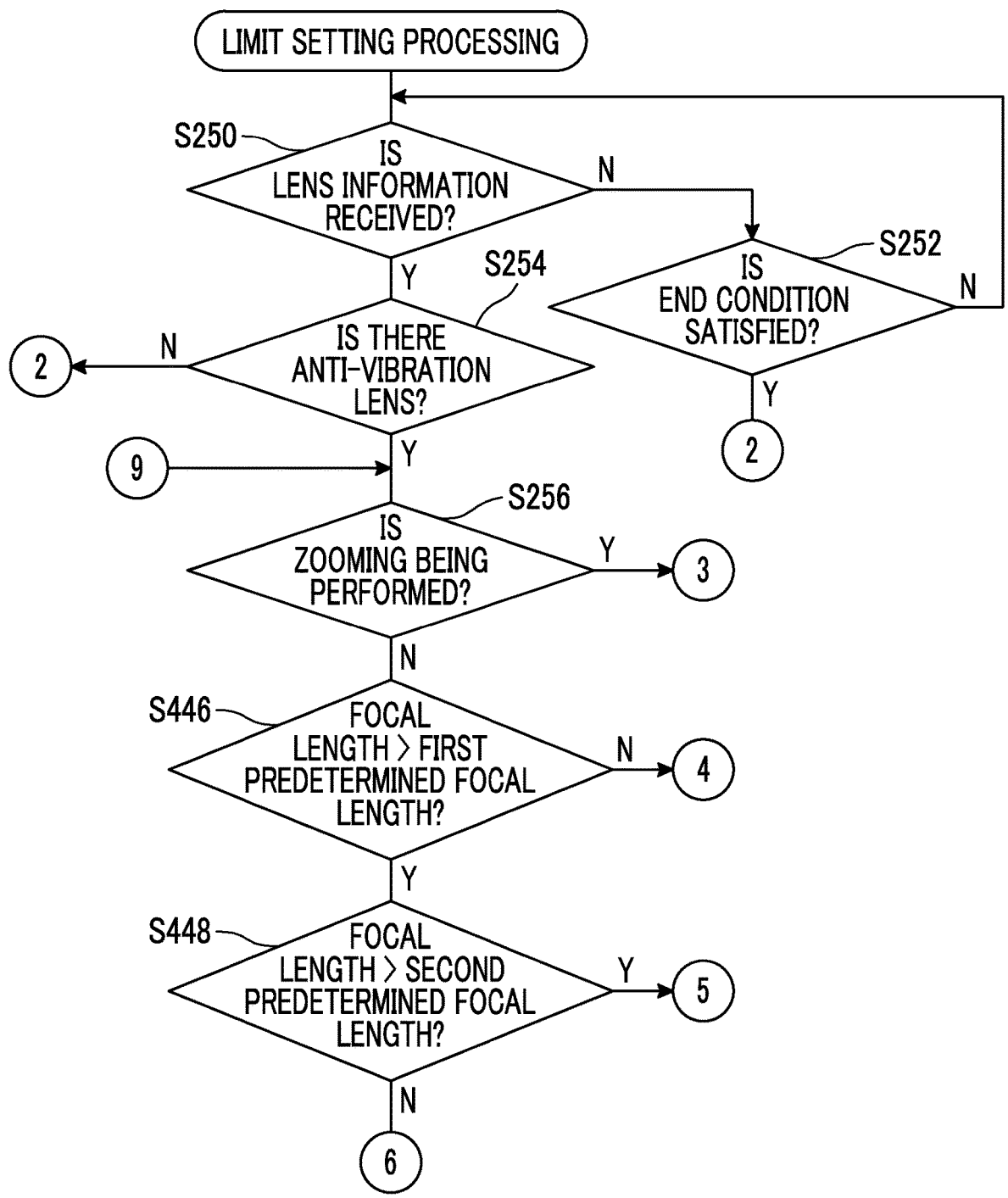
FIG. 16 is a flowchart showing an example of the flow of limit setting processing according to the fifth embodiment.

In Step 446 shown in FIG. 16, the CPU 74 determines whether or not a focal length included in the lens information 130 acquired in Step 250 exceeds the first predetermined focal length.

Figure 17:
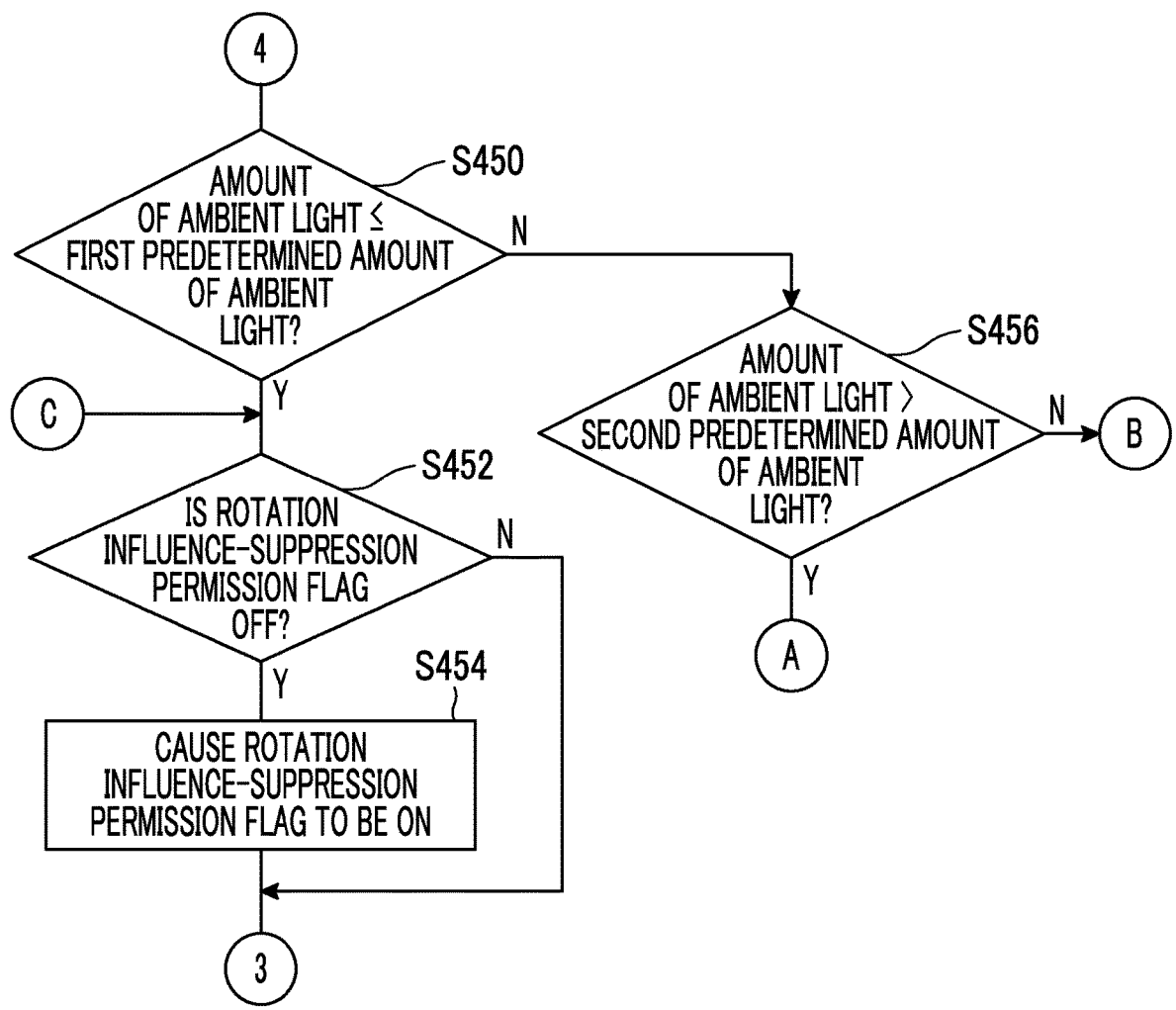
FIG. 17 is a continuation of the flowchart shown in FIG. 16.

In a case where a focal length is equal to or shorter than the first predetermined focal length in Step 446, the determination is negative and the processing proceeds to Step 450 shown in FIG. 17. In a case where a focal length exceeds the first predetermined focal length in Step 446, the determination is positive and the processing proceeds to Step 448.

In Step 448, the CPU 74 determines whether or not a focal length included in the lens information 130 acquired in Step 250 exceeds the second predetermined focal length.

Figure 18:
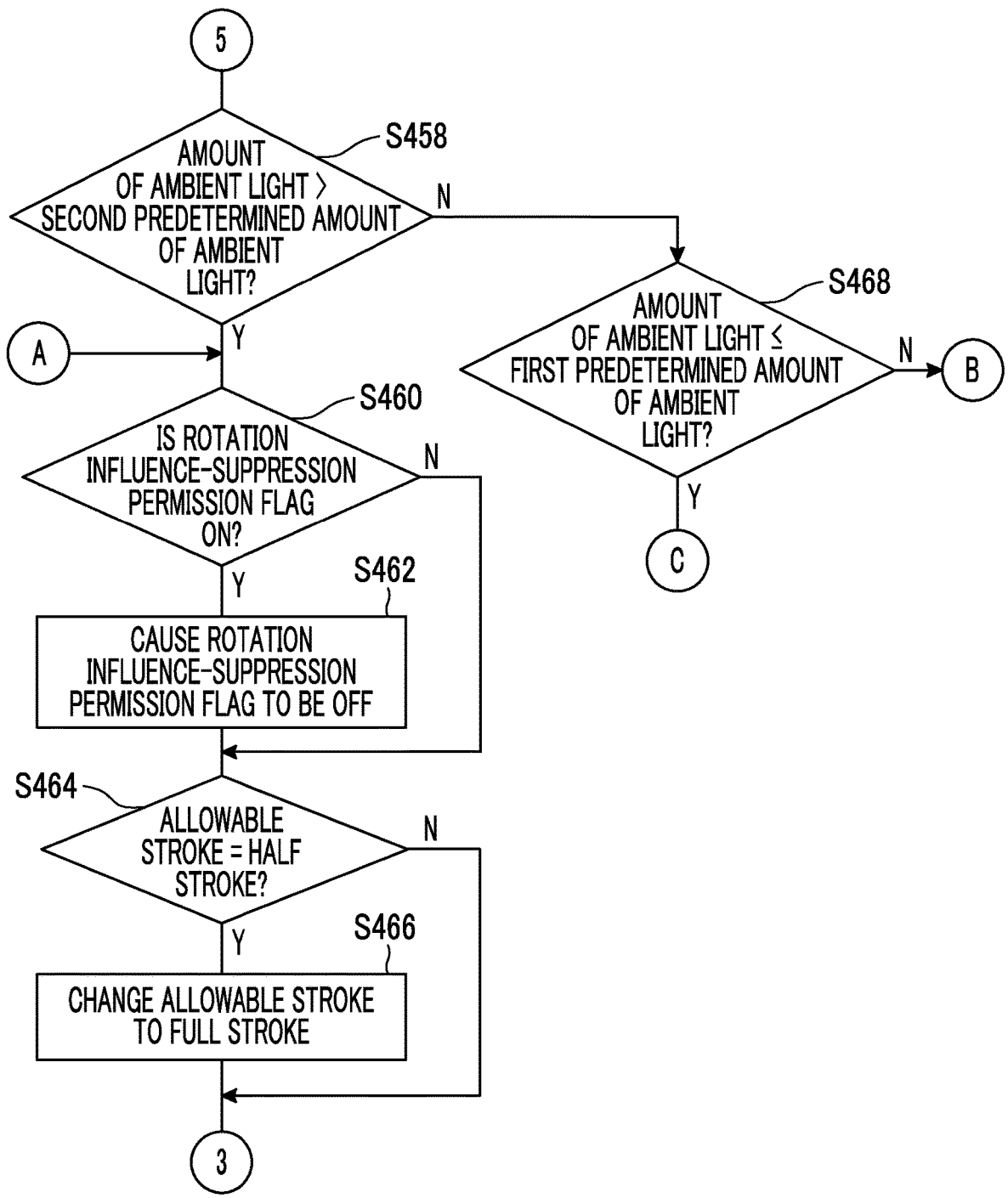
FIG. 18 is a continuation of the flowchart shown in FIG. 16.

In a case where a focal length is equal to or shorter than the second predetermined focal length in Step 448, the determination is negative and the processing proceeds to Step 458 shown in FIG. 18. In a case where a focal length exceeds the second predetermined focal length in Step 448, the determination is positive and the processing proceeds to Step 470 shown in FIG. 19.

In Step 450 shown in FIG. 17, the CPU 74 determines whether or not the amount of ambient light included in the lens information 130 acquired in Step 250 is equal to or smaller than the first predetermined amount of ambient light.

In a case where the amount of ambient light is equal to or smaller than the first predetermined amount of ambient light in Step 450, the determination is positive and the processing proceeds to Step 452. In a case where the amount of ambient light exceeds the first predetermined amount of ambient light in Step 450, the determination is negative and the processing proceeds to Step 456.

In Step 452, the CPU 74 determines whether or not the rotation influence-suppression permission flag is off. In a case where the rotation influence-suppression permission flag is on in Step 452, the determination is negative and the processing proceeds to Step 282 shown in FIG. 20. In a case where the rotation influence-suppression permission flag is off in Step 452, the determination is positive and the processing proceeds to Step 454.

Figure 20:
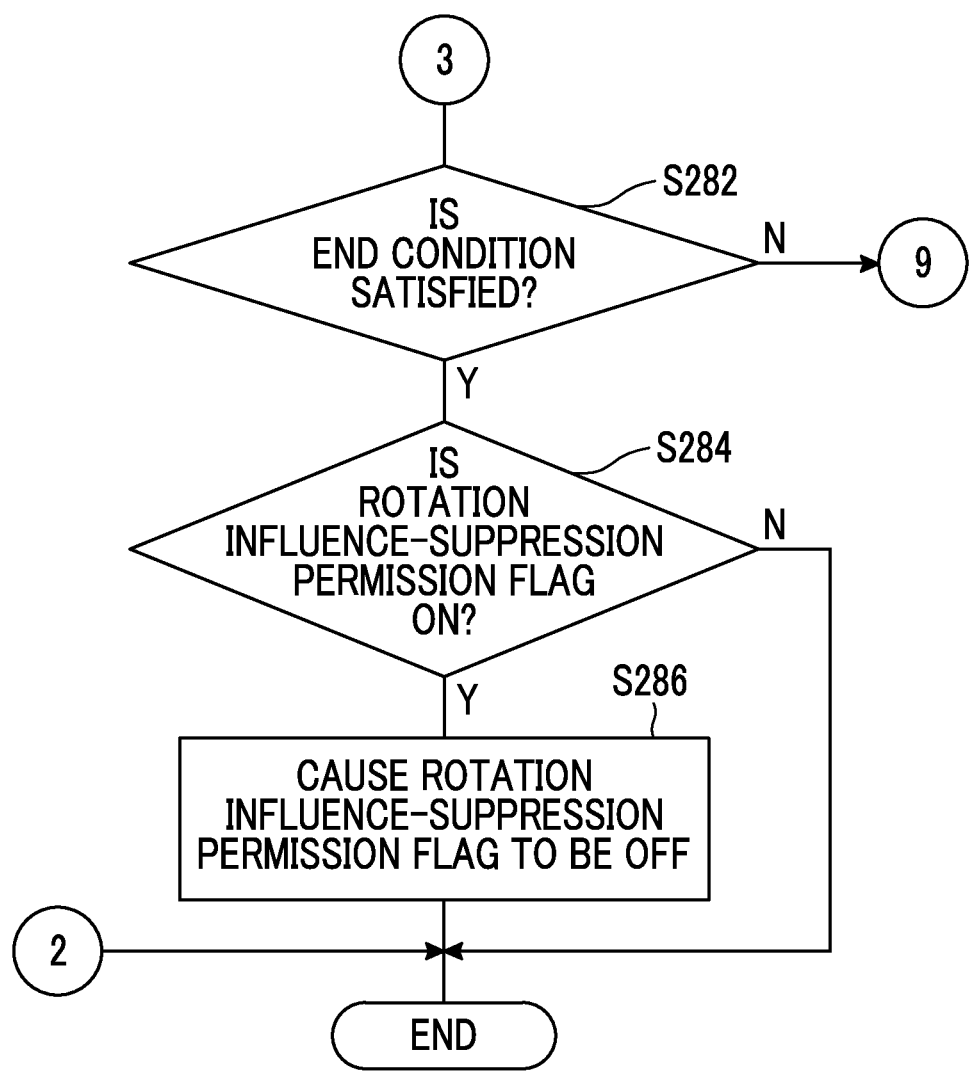
FIG. 20 is a continuation of the flowchart shown in FIG. 16.

The CPU 74 causes the rotation influence-suppression permission flag to be on in Step 454, and the processing then proceeds to Step 282 shown in FIG. 20.

In Step 456, the CPU 74 determines whether or not the amount of ambient light included in the lens information 130 acquired in Step 250 exceeds the second predetermined amount of ambient light.

Figure 19:
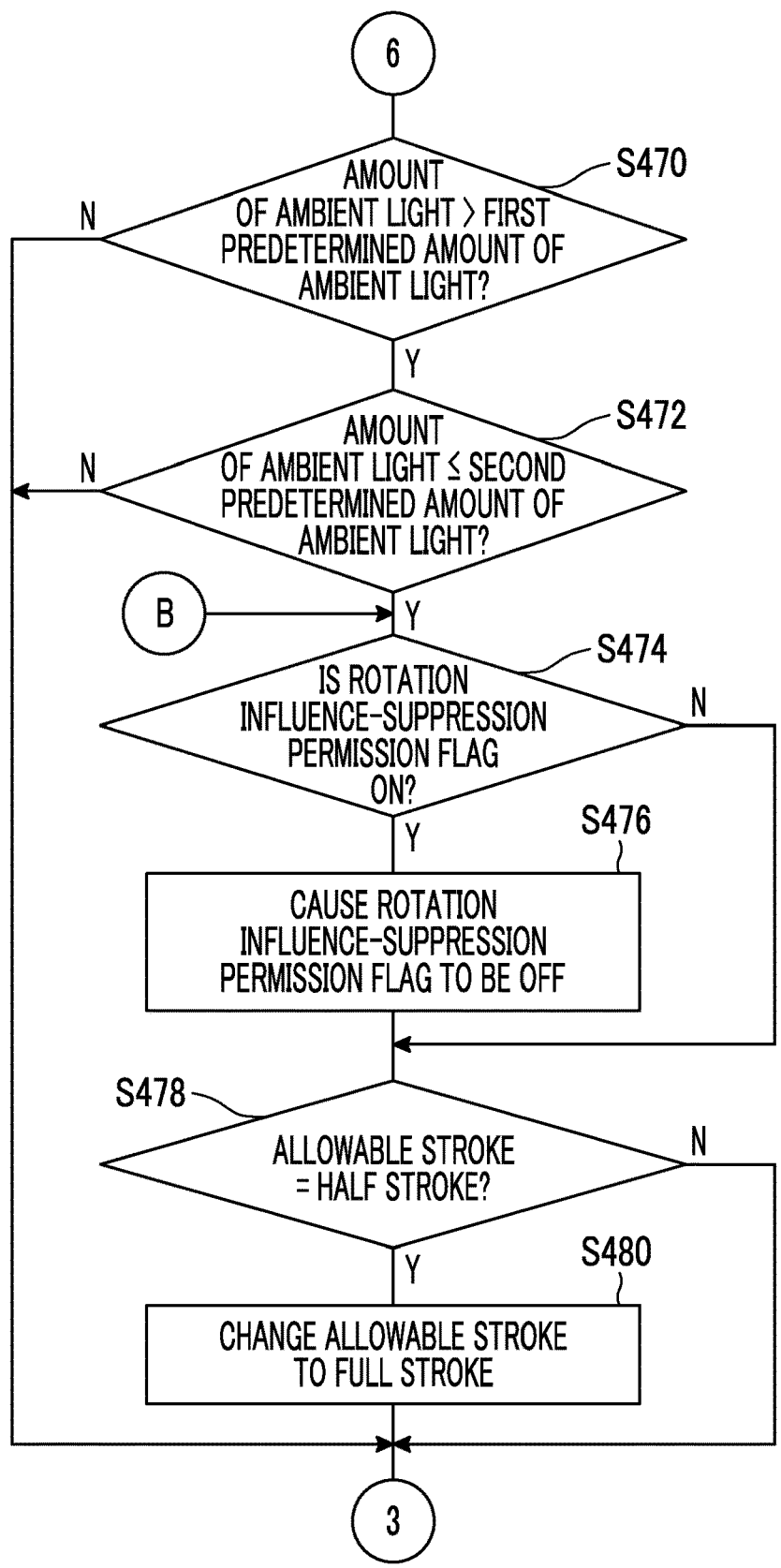
FIG. 19 is a continuation of the flowchart shown in FIG. 16.

In a case where the amount of ambient light is equal to or smaller than the second predetermined amount of ambient light in Step 456, the determination is negative and the processing proceeds to Step 474 shown in FIG. 19. In a case where a focal length exceeds the second predetermined amount of ambient light in Step 456, the determination is positive and the processing proceeds to Step 460 shown in FIG. 18.

In Step 458 shown in FIG. 18, the CPU 74 determines whether or not the amount of ambient light included in the lens information 130 acquired in Step 250 exceeds the second predetermined amount of ambient light.

In a case where the amount of ambient light exceeds the second predetermined amount of ambient light in Step 458, the determination is positive and the processing proceeds to Step 460. In a case where the amount of ambient light is equal to or smaller than the second predetermined amount of ambient light in Step 458, the determination is negative and the processing proceeds to Step 468.

In Step 468, the CPU 74 determines whether or not the amount of ambient light included in the lens information 130 acquired in Step 250 is equal to or smaller than the first predetermined amount of ambient light.

In a case where the amount of ambient light is equal to or smaller than the first predetermined amount of ambient light in Step 458, the determination is positive and the processing proceeds to Step 452 shown in FIG. 17. In a case where the amount of ambient light exceeds the first predetermined amount of ambient light in Step 458, the determination is negative and the processing proceeds to Step 474 shown in FIG. 19.

In Step 460, the CPU 74 determines whether or not the rotation influence-suppression permission flag is on. In a case where the rotation influence-suppression permission flag is on in Step 460, the determination is positive and the processing proceeds to Step 462. In a case where the rotation influence-suppression permission flag is off in Step 460, the determination is negative and the processing proceeds to Step 464.

The CPU 74 causes the rotation influence-suppression permission flag to be off in Step 462, and the processing then proceeds to Step 464.

In Step 464, the CPU 74 determines whether or not the half stroke is employed as the current allowable stroke. In a case where the half stroke is employed as the current allowable stroke in Step 464, the determination is positive and the processing proceeds to Step 466. In a case where the full stroke is employed as the current allowable stroke in Step 464, the determination is negative and the processing proceeds to Step 282 shown in FIG. 20.

The CPU 74 changes the allowable stroke to the full stroke from the half stroke in Step 466, and the processing then proceeds to Step 282 shown in FIG. 20.

In Step 470 shown in FIG. 19, the CPU 74 determines whether or not the amount of ambient light included in the lens information 130 acquired in Step 250 exceeds the first predetermined amount of ambient light.

In a case where the amount of ambient light is equal to or smaller than the first predetermined amount of ambient light in Step 470, the determination is negative and the processing proceeds to Step 282 shown in FIG. 20. In a case where the amount of ambient light exceeds the first predetermined amount of ambient light in Step 470, the determination is positive and the processing proceeds to Step 472.

In Step 472, the CPU 74 determines whether or not the amount of ambient light included in the lens information 130 acquired in Step 250 is equal to or smaller than the second predetermined amount of ambient light.

In a case where the amount of ambient light is equal to or smaller than the second predetermined amount of ambient light in Step 472, the determination is positive and the processing proceeds to Step 474. In a case where the amount of ambient light exceeds the second predetermined amount of ambient light in Step 472, the determination is negative and the processing proceeds to Step 282 shown in FIG. 20.

In Step 474, the CPU 74 determines whether or not the rotation influence-suppression permission flag is on. In a case where the rotation influence-suppression permission flag is on in Step 474, the determination is positive and the processing proceeds to Step 476. In a case where the rotation influence-suppression permission flag is off in Step 474, the determination is negative and the processing proceeds to Step 478.

The CPU 74 causes the rotation influence-suppression permission flag to be off in Step 476, and the processing then proceeds to Step 478.

In Step 478, the CPU 74 determines whether or not the full stroke is employed as the current allowable stroke. In a case where the full stroke is employed as the current allowable stroke in Step 478, the determination is positive and the processing proceeds to Step 480. In a case where the half stroke is employed as the current allowable stroke in Step 478, the determination is negative and the processing proceeds to Step 282 shown in FIG. 20.

As described above, a limit is determined in the imaging device 10D according to a focal length and the amount of ambient light. Therefore, according to the imaging device 10D, both a blurring influence and the deterioration of image quality to be caused by the interchange of the imaging lens 14 can be suppressed as compared to a case where a limit is fixed despite a change in a focal length and the amount of ambient light.

Further, in a case where a focal length is equal to or shorter than the first predetermined focal length (Step 446: N) and the amount of ambient light is equal to or smaller than the first predetermined amount of ambient light (Step 450: Y), the rotation influence-suppression permission flag is caused to be on in the imaging device 10D (Step 454). Accordingly, only the rotation influence-suppression processing of the influence-suppression processing is performed. Therefore, according to the imaging device 10D, both a blurring influence and the deterioration of image quality to be caused by the interchange of the imaging lens 14 can be suppressed as compared to a case where the rotation influence-suppression processing and the non-rotation influence-suppression processing are always performed regardless of whether or not a focal length and the amount of ambient light are changed.

Furthermore, in a case where a focal length exceeds the first predetermined focal length (Step 446: Y) and the amount of ambient light exceeds the first predetermined amount of ambient light (Step 450: N), the rotation influence-suppression processing and the non-rotation influence-suppression processing are performed in the imaging device 10D. Therefore, according to the imaging device 10D, a rotation influence and a non-rotation influence can be suppressed as compared to a case where only the rotation influence-suppression processing is always performed regardless of whether or not a focal length and the amount of ambient light are changed.

Further, in a case where a focal length exceeds the first predetermined focal length and is equal to or shorter than the second predetermined focal length and the amount of ambient light exceeds the first predetermined amount of ambient light and is equal to or smaller than the second predetermined amount of ambient light (Step 472: Y), the non-rotation influence-suppression processing within the half stroke is performed in the imaging device 10D. Therefore, according to the imaging device 10D, both a blurring influence and the deterioration of image quality to be caused by the interchange of the imaging lens 14 can be suppressed as compared to a case where the non-rotation influence-suppression processing within the full stroke is always performed regardless of whether or not a focal length and the amount of ambient light are changed.

Furthermore, in a case where a focal length exceeds the second predetermined focal length and the amount of ambient light exceeds the second predetermined amount of ambient light (Step 458: Y), the non-rotation influence-suppression processing with the fill stroke can be performed in the imaging device 10D. Therefore, according to the imaging device 10D, a non-rotation influence can be suppressed as compared to a case where the non-rotation influence-suppression processing with the full stroke is always prevented despite a change in a focal length and the amount of ambient light.

Sixth Embodiment

A case where a limit is determined according to a focal length in addition to an operating mode and a subject distance has been described in the second embodiment, but a case where a limit is determined according to a focal length and the amount of ambient light in addition to an operating mode and a subject distance will be described in a sixth embodiment. In the sixth embodiment, the same components as the components described in the first embodiment will be denoted by the same reference numerals as those of the first embodiment and the description thereof will be omitted.

As shown in, for example, FIGS. 1 to 4, an imaging device 10E according to the sixth embodiment is different from the imaging device 10 according to the first embodiment in that the imaging device 10E includes an imaging device body 12E instead of the imaging device body 12.

As shown in, for example, FIG. 3, the imaging device body 12E is different from the imaging device body 12 in that the imaging device body 12E includes a body-side main controller 46E instead of the body-side main controller 46. The body-side main controller 46E is different from the body-side main controller 46 in that the body-side main controller 46E includes a secondary storage unit 78E instead of the secondary storage unit 78.

As shown in, for example, FIG. 6, the secondary storage unit 78E is different from the secondary storage unit 78 in that the secondary storage unit 78E stores a limit setting program 136E instead of the limit setting program 136. The CPU 74 reads the limit setting program 136E from the secondary storage unit 78E, develops the limit setting program 136E in the primary storage unit 76, and performs limit setting processing shown in FIG. 12 and FIGS. 21 to 23 according to the developed limit setting program 136E. In other words, the CPU 74 operates as a control unit according to the technique of the disclosure by executing the limit setting program 136E.

For the convenience of description, the imaging devices 10, 10A, 10B, 10C, 10D, and 10E will be referred to as "imaging devices" without being denoted by reference numerals in the following description in a case where the imaging devices 10, 10A, 10B, 10C, 10D, and 10E do not need to be described while being distinguished from each other. Further, for the convenience of description, the imaging device bodies 12, 12A, 12B, 12C, 12D, and 12E will be referred to as "imaging device bodies" without being denoted by reference numerals in the following description in a case where the imaging device bodies 12, 12A, 12B, 12C, 12D, and 12E do not need to be described while being distinguished from each other. Furthermore, for the convenience of description, the secondary storage units 78, 78A, 78B, 78C, 78D, and 78E will be referred to as "secondary storage units" without being denoted by reference numerals in the following description in a case where the secondary storage units 78, 78A, 78B, 78C, 78D, and 78E do not need to be described while being distinguished from each other. Moreover, for the convenience of description, the body-side anti-vibration program 134 and the limit setting programs 136, 136A, 136B, 136C, 136D, and 136E will be simply referred to as "body-side programs" in the following description in a case where the body-side anti-vibration program 134 and the limit setting programs 136, 136A, 136B, 136C, 136D, and 136E are to be generically named.

Next, the limit setting processing shown in FIG. 12 and FIGS. 21 to 23 will be described as the actions of parts of the imaging device 10E according to the technique of the disclosure. The description of the same actions as the actions of the second embodiment will be omitted.

The limit setting processing shown in FIG. 12 and FIGS. 21 to 23 is performed by the CPU 74 of the imaging device body 12E in a case where the power supply of the imaging device 10E is turned on (power is supplied to the imaging device 10E) in a state where the imaging lens 14 is connected to the imaging device body 12E through the mounts 13 and 15. In the following description, the same steps as the steps of the flowchart shown in FIGS. 12 and 13 will be denoted by the same step numbers as those of the flowchart and the description thereof will be omitted.

The limit setting processing shown in FIG. 12 and FIGS. 21 to 23 is different from the limit setting processing shown in FIGS. 12 and 13 in that the limit setting processing shown in FIG. 12 and FIGS. 21 to 23 includes Steps 496 and 498 instead of Steps 322 and 326. Further, the limit setting processing shown in FIG. 12 and FIGS. 21 to 23 is different from the limit setting processing shown in FIGS. 12 and 13 in that the limit setting processing shown in FIG. 12 and FIGS. 21 to 23 includes Steps 500 to 514.

Figure 21:
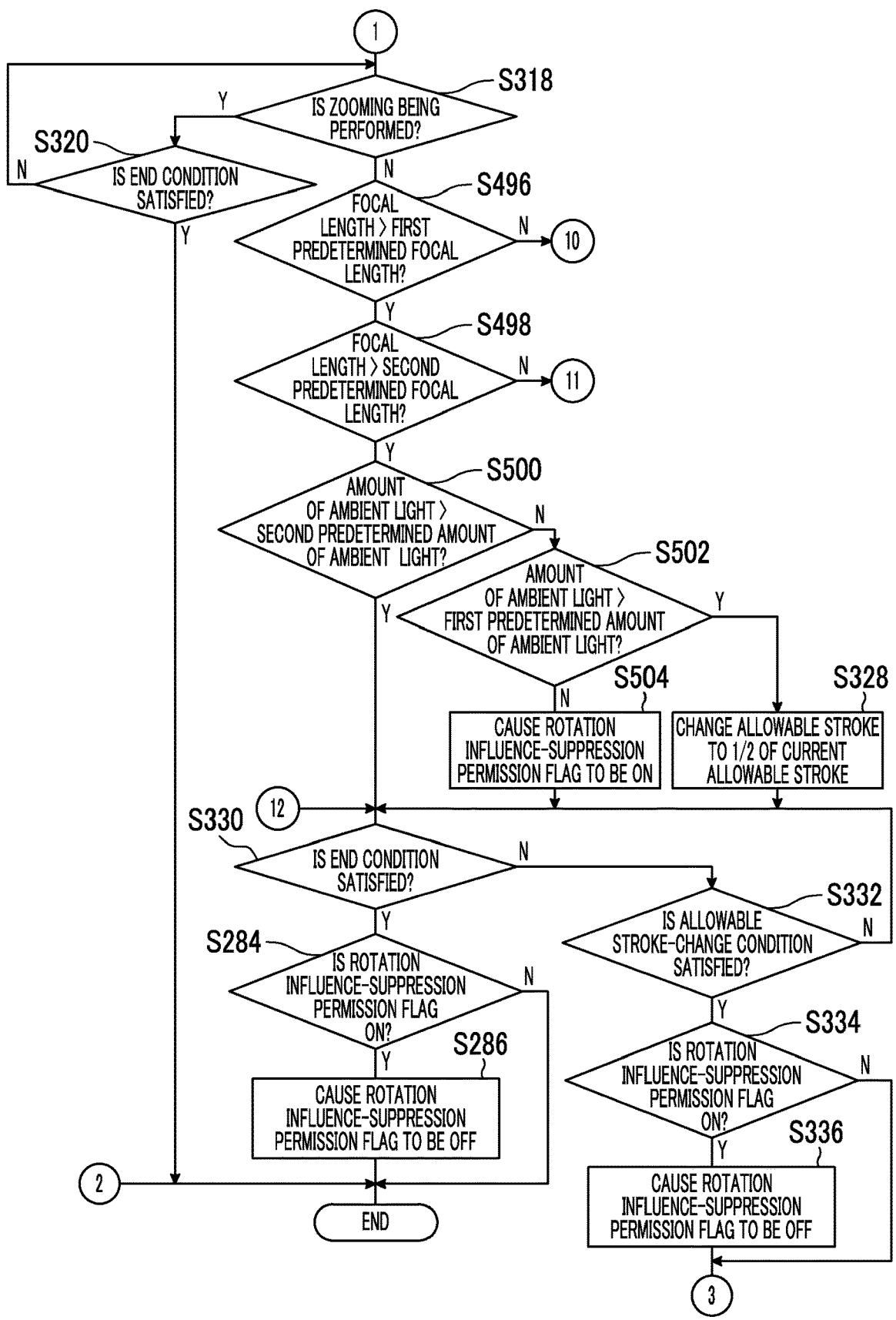
FIG. 21 is a flowchart showing an example of the flow of limit setting processing according to the sixth embodiment, and is a continuation of the flowchart shown in FIG. 12.

In Step 496 shown in FIG. 21, the CPU 74 determines whether or not a focal length exceeds a first predetermined focal length. In a case where a focal length is equal to or shorter than the first predetermined focal length in Step 496, the determination is negative and the processing proceeds to Step 506 shown in FIG. 22. In a case where a focal length exceeds the first predetermined focal length in Step 496, the determination is positive and the processing proceeds to Step 498. The first predetermined focal length in Step 496 is an example of a first threshold value according to the technique of the disclosure.

In Step 498, the CPU 74 determines whether or not a focal length exceeds a second predetermined focal length. In a case where a focal length is equal to or shorter than the second predetermined focal length in Step 498, the determination is negative and the processing proceeds to Step 510 shown in FIG. 23. In a case where a focal length exceeds the second predetermined focal length in Step 498, the determination is positive and the processing proceeds to Step 500. The second predetermined focal length in Step 498 is an example of a third threshold value according to the technique of the disclosure.

In Step 500, the CPU 74 determines whether or not the amount of ambient light included in the lens information 130 acquired in Step 250 exceeds a second predetermined amount of ambient light. The second predetermined amount of ambient light in Step 500 is an example of a fourth threshold value according to the technique of the disclosure.

In a case where the amount of ambient light is equal to or smaller than the second predetermined amount of ambient light in Step 500, the determination is negative and the processing proceeds to Step 502. In a case where the amount of ambient light exceeds the second predetermined amount of ambient light in Step 500, the determination is positive and the processing proceeds to Step 330.

In Step 502, the CPU 74 determines whether or not the amount of ambient light included in the lens information 130 acquired in Step 250 exceeds a first predetermined amount of ambient light. The first predetermined amount of ambient light in Step 502 is an example of a second threshold value.

In a case where the amount of ambient light is equal to or smaller than the first predetermined amount of ambient light in Step 502, the determination is negative and the processing proceeds to Step 504. In a case where a focal length exceeds the first predetermined amount of ambient light in Step 502, the determination is positive and the processing proceeds to Step 328.

The CPU 74 causes the rotation influence-suppression permission flag to be on in Step 504, and the processing then proceeds to Step 330.

Figure 22:
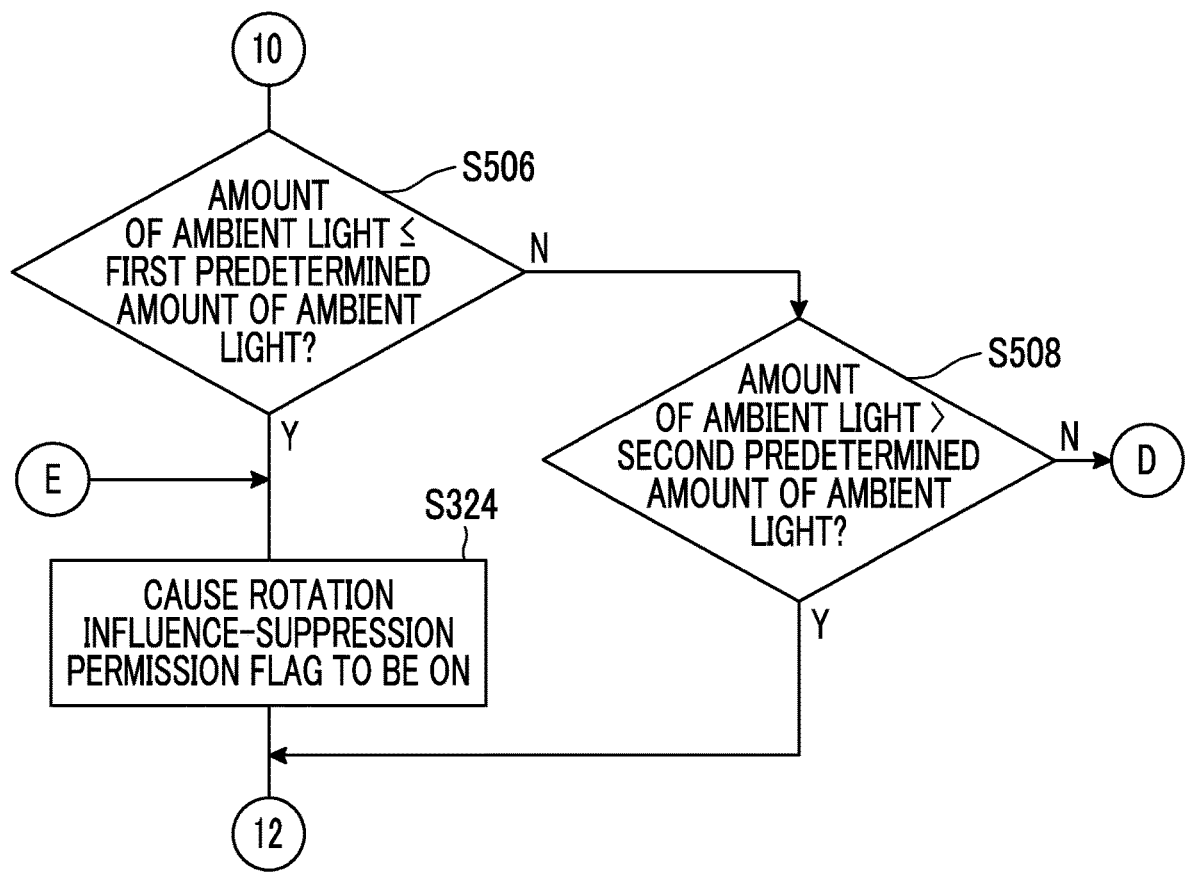
FIG. 22 is a continuation of the flowchart shown in FIG. 21.

In Step 506 shown in FIG. 22, the CPU 74 determines whether or not the amount of ambient light included in the lens information 130 acquired in Step 250 is equal to or smaller than the first predetermined amount of ambient light.

In a case where the amount of ambient light is equal to or smaller than the first predetermined amount of ambient light in Step 506, the determination is positive and the processing proceeds to Step 324. In a case where the amount of ambient light exceeds the first predetermined amount of ambient light in Step 506, the determination is negative and the processing proceeds to Step 508.

In Step 508, the CPU 74 determines whether or not the amount of ambient light included in the lens information 130 acquired in Step 250 exceeds the second predetermined amount of ambient light.

Figure 23:
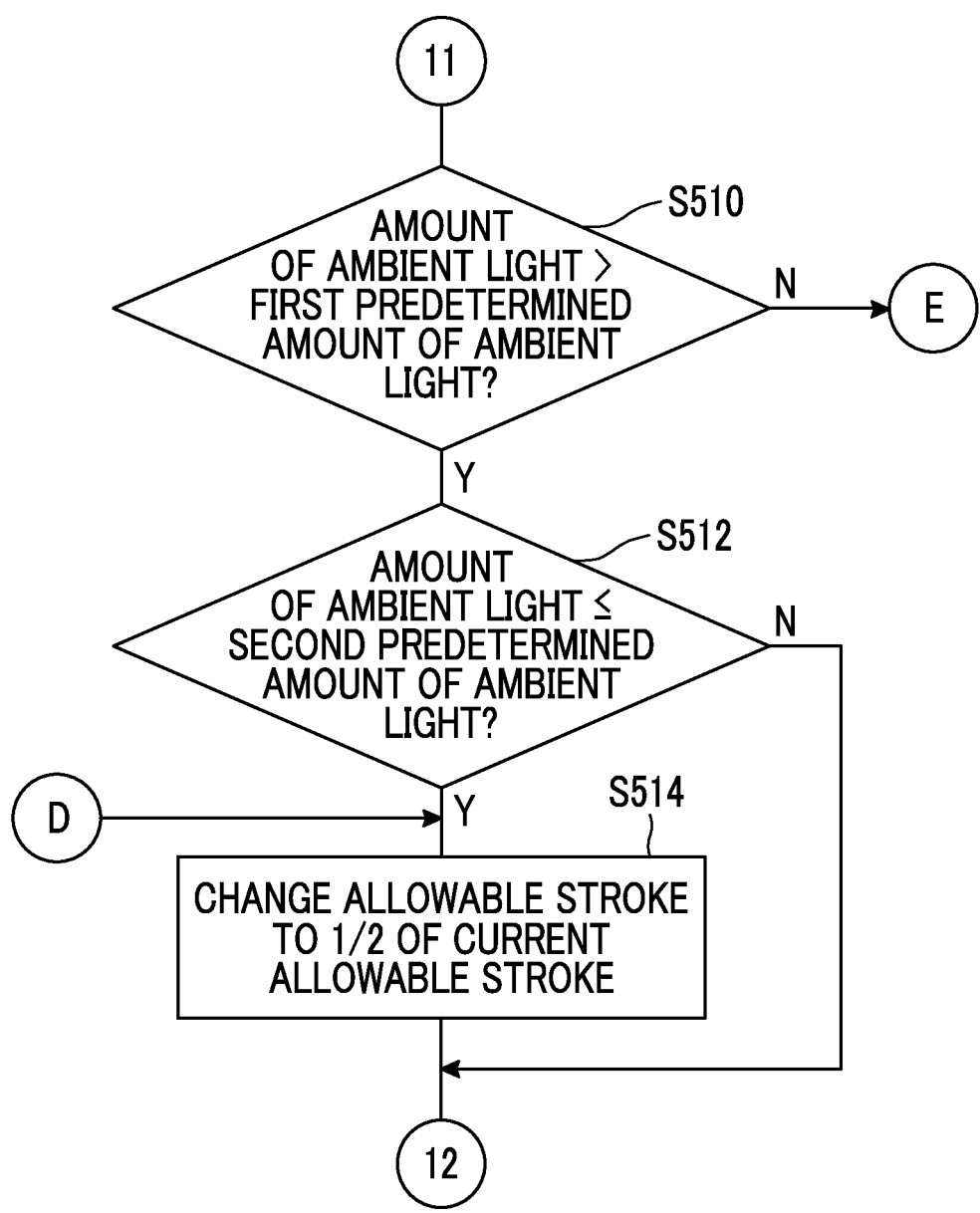
FIG. 23 is a continuation of the flowchart shown in FIG. 21.

In a case where the amount of ambient light is equal to or smaller than the second predetermined amount of ambient light in Step 508, the determination is negative and the processing proceeds to Step 514 shown in FIG. 23. In a case where a focal length exceeds the second predetermined amount of ambient light in Step 508, the determination is positive and the processing proceeds to Step 330 shown in FIG. 21.

In Step 510 shown in FIG. 23, the CPU 74 determines whether or not a focal length exceeds the first predetermined focal length. In a case where a focal length is equal to or shorter than the first predetermined focal length in Step 510, the determination is negative and the processing proceeds to Step 324 shown in FIG. 22. In a case where a focal length exceeds the first predetermined focal length in Step 510, the determination is positive and the processing proceeds to Step 512.

In Step 512, the CPU 74 determines whether or not a focal length is equal to or shorter than the second predetermined focal length. In a case where a focal length is equal to or shorter than the second predetermined focal length in Step 512, the determination is positive and the processing proceeds to Step 514. In a case where a focal length exceeds the second predetermined focal length in Step 512, the determination is negative and the processing proceeds to Step 330 shown in FIG. 21.

The CPU 74 changes the allowable stroke to ½ of the current allowable stroke in Step 514, and the processing then proceeds to Step 330.

According to the imaging device 10E, as described above, both a blurring influence and the deterioration of image quality to be caused by the interchange of the imaging lens 14 can be suppressed as compared to a case where the suppression of a blurring influence is always limited with a constant limit despite a change in an operating mode, a subject distance, a focal length, and the amount of ambient light.

In the limit setting processing according to the sixth embodiment, the processing of Steps 328 and 514 has been exemplified as processing for changing the allowable stroke to ½ of the current allowable stroke. However, the technique of the disclosure is not limited thereto. For example, the CPU 74 may perform the processing of Step 514 without performing the processing of Step 328.

Further, in the limit setting processing according to the sixth embodiment, the processing of Steps 324 and 504 has been exemplified as processing for causing the rotation influence-suppression permission flag to be on. However, the technique of the disclosure is not limited thereto. For example, the CPU 74 may perform the processing of Step 324 without performing the processing of Step 504.

Furthermore, processing for maintaining the current allowable stroke in a case where determination in each of Steps 500, 508, and 512 is positive has been exemplified in the limit setting processing according to the sixth embodiment, but the technique of the disclosure is not limited thereto. For example, the current allowable stroke may be maintained only in a case where determination in Step 500 among Steps 500, 508, and 512 is positive. Further, for example, the allowable stroke may be changed to ⅔ of the current allowable stroke in a where determination in each of Steps 508 and 512 is positive.

Further, a case where the processing of Steps 328 and 514 is performed to change the allowable stroke to ½ of the current allowable stroke has been described in the sixth embodiment, but the technique of the disclosure is not limited thereto. For example, the allowable stroke may be changed to ⅓, ⅔, ¾, or the like of the current allowable stroke, and may be determined according to a focal length, the amount of ambient light, and the like so that the allowable stroke is shorter than the current allowable stroke.

Furthermore, a case where a limit is determined according to a focal length and the like has been described in each embodiment, but the technique of the disclosure is not limited thereto. For example, a limit may be reduced as the stop value (for example, F number) of the stop 19 is increased. The reason for this is that a blurring influence is increased since a shutter speed is lower as the stop value is larger. Here, "reduce a limit" refers to, for example, changing a state to a state where the rotation influence-suppression processing and the non-rotation influence-suppression processing are performed from a state where the rotation influence-suppression processing or the non-rotation influence-suppression processing is performed, or increasing the allowable stroke in the non-rotation influence-suppression processing.

In a case where the CPU 74 is to adjust a limit according to a stop value, for example, the lens information 130 is information including a stop value and the CPU 74 acquires the lens information 130 from the imaging lens 14 and adjusts a limit according to the stop value included in the acquired lens information 130. That is, the CPU 74 controls the BIS drive unit 80 so that a limit is reduced as a stop value is increased. Accordingly, the imaging device can suppress a blurring influence as compared to a case where a limit is fixed despite a change in a stop value.

Further, the imaging device on which the gyro sensor 70 is mounted has been described in each embodiment, but the technique of the disclosure is not limited thereto. For example, in a case where the gyro sensor 70 is not mounted on the imaging device, an electronic device on which a gyro sensor and/or an acceleration sensor are mounted is mounted on the imaging device and the gyro sensor and/or the acceleration sensor of the electronic device may be adapted to contribute to influence-suppression processing. Examples of the electronic device on which the gyro sensor and/or the acceleration sensor are mounted include a smart device.

Figure 24:
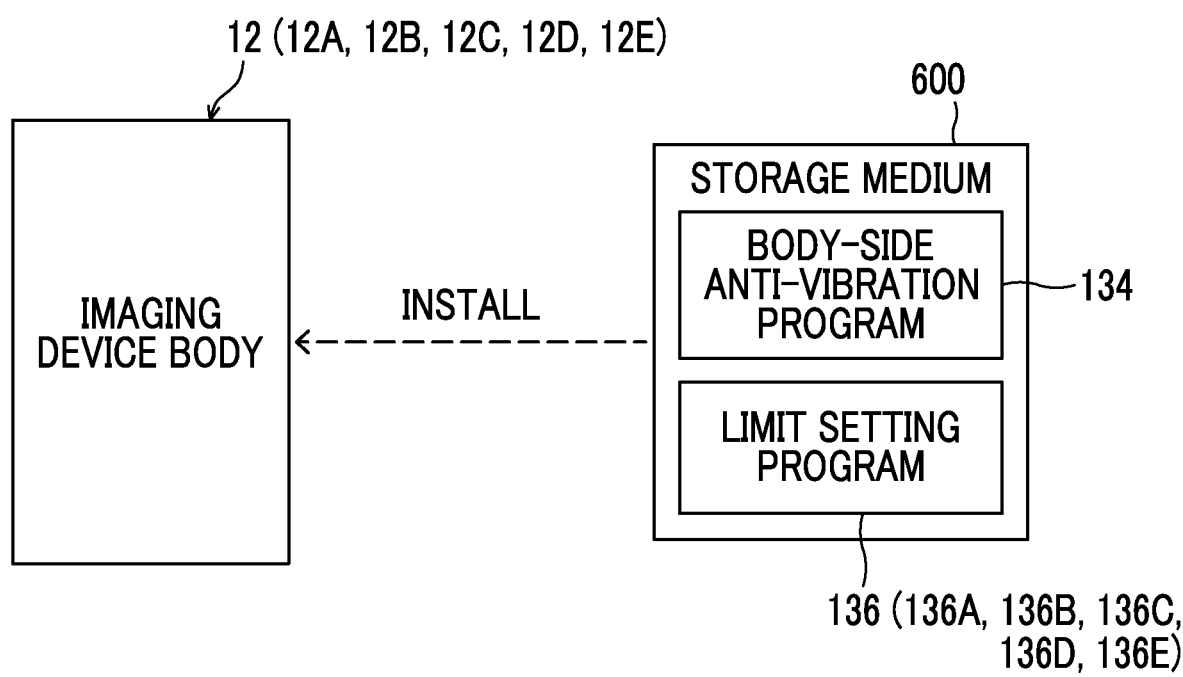
FIG. 24 is a conceptual diagram showing an example of an aspect where a body-side anti-vibration program and a limit setting program are installed on the imaging device body from a storage medium in which body-side anti-vibration programs and limit setting programs according to the first to sixth embodiments are stored.

Furthermore, a case where the body-side programs are read from the secondary storage unit has been exemplified in each embodiment, but the body-side programs do not necessarily need to be stored in the secondary storage unit from the beginning. For example, as shown in FIG. 24, the body-side programs may be stored in an arbitrary portable storage medium 600, such as an SSD, a USB memory, or a CD-ROM, first. In this case, the body-side programs of the storage medium 600 are installed on the imaging device body, and the installed body-side programs are executed by the CPU 74.

Moreover, the body-side programs may be stored in storage units of other computers, a server device, or the like connected to the imaging device body through a communication network (not shown), and may be downloaded in response to the request of the imaging device body. In this case, the downloaded body-side programs are executed by the CPU 74.

Further, the lens-side anti-vibration processing, the body-side anti-vibration processing, and the limit setting processing described in each embodiment are merely examples. Accordingly, it goes without saying that unnecessary steps may be deleted, new steps may be added, or the sequence of the steps may be changed without departing from the scope of the disclosure.

Furthermore, a case where the lens-side anti-vibration processing, the body-side anti-vibration processing, and the limit setting processing are realized by software configuration using a computer has been exemplified in each embodiment, but the technique of the disclosure is not limited thereto. For example, at least one of the lens-side anti-vibration processing, the body-side anti-vibration processing, or the limit setting processing may be adapted to be performed by only hardware configuration, such as FPGA or ASIC, instead of software configuration using a computer. At least one of the lens-side anti-vibration processing, the body-side anti-vibration processing, or the limit setting processing may be adapted to be performed by configuration where software configuration and hardware configuration are combined with each other.

All documents, patent applications, and technical standards disclosed in this specification are incorporated in this specification by reference so that the incorporation of each of the documents, the patent applications, and the technical standards by reference is specific and is as detailed as each of the documents, the patent applications, and the technical standards.

What is claimed is:

1. An imaging device, comprising:
   an imaging device body including an imaging element that receives reflected light representing a subject as a subject image, and a body-side suppression unit that suppresses an influence of vibration, which is applied to a device, on the subject image on the basis of a detection result of a detection unit that detects the vibration; and a control unit that effects control on the body-side suppression unit so as to suppress the influence of vibration in accordance with a degree of limitation that is a degree for limiting the suppression of the influence performed by the body-side suppression unit and that is determined in accordance with information related to an interchangeable imaging lens mounted on the imaging device body, wherein:

the influence is broadly classified as comprising a rotation influence that rotates the subject image about a center of the imaging lens and a non-rotation influence that is a different influence from the rotation influence, the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result, the information includes a focal length of the imaging lens, the degree of limitation is determined according to the focal length, and the control unit effects control on the body-side suppression unit so as to cause the body-side suppression unit to perform only the rotation influence-suppression processing in a case in which the focal length is equal to or smaller than a first threshold value, and effects control on the body-side suppression unit so as to cause the body-side suppression unit to perform, of the rotation influence-suppression processing or the non-rotation influence-suppression processing, at least the non-rotation influence-suppression processing in a case in which the focal length exceeds the first threshold value.

2. The imaging device according to claim 1, wherein the control unit effects control on the body-side suppression unit so as to perform the non-rotation influence-suppression processing in a state in which straight movement of the imaging element in a maximum movable range, which is a range in which the imaging element is movable in a straight direction to a maximum, is prevented in a case in which the focal length exceeds the first threshold value and is equal to or smaller than a second threshold value, which is a value exceeding the first threshold value, and effects control on the body-side suppression unit to perform the non-rotation influence-suppression processing in a state in which the straight movement in the maximum movable range is allowed in a case in which the focal length exceeds the second threshold value.

3. An imaging device, comprising:

an imaging device body including an imaging element that receives reflected light representing a subject as a subject image, and a body-side suppression unit that suppresses an influence of vibration, which is applied to a device, on the subject image on the basis of a detection result of a detection unit that detects the vibration; and a control unit that effects control on the body-side suppression unit so as to suppress the influence of vibration in accordance with a degree of limitation that is a degree for limiting the suppression of the influence performed by the body-side suppression unit and that is determined in accordance with information related to an interchangeable imaging lens mounted on the imaging device body, wherein:

the influence is broadly classified as comprising a rotation influence that rotates the subject image about a center of the imaging lens and a non-rotation influence that is a different influence from the rotation influence, the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result, the control unit effects, on the body-side suppression unit, control causing the body-side suppression unit to perform only the rotation influence-suppression processing or control causing the body-side suppression unit to perform, of the rotation influence-suppression processing or the non-rotation influence-suppression processing, at least the non-rotation influence-suppression processing, in accordance with the information, the information includes a physical quantity representing optical characteristics of a peripheral area of the imaging lens, and the degree of limitation is determined according to the physical quantity.

4. The imaging device according to claim 3, wherein the control unit effects control on the body-side suppression unit so as to cause the body-side suppression unit to perform only the rotation influence-suppression processing in a case in which the physical quantity is equal to or smaller than a first threshold value, and effects control on the body-side suppression unit so as to cause the body-side suppression unit to perform, of the rotation influence-suppression processing or the non-rotation influence-suppression processing, at least the non-rotation influence-suppression processing in a case in which the physical quantity exceeds the first threshold value.

5. The imaging device according to claim 4, wherein the control unit effects control on the body-side suppression unit so as to perform the non-rotation influence-suppression processing in a state in which straight movement of the imaging element in a maximum movable range, which is a range in which the imaging element is movable in a straight direction to a maximum, is prevented in a case in which the physical quantity exceeds the first threshold value and is equal to or smaller than a second threshold value, which is a value exceeding the first threshold value, and effects control on the body-side suppression unit so as to perform the non-rotation influence-suppression processing in a state in which the straight movement in the maximum movable range is allowed in a case in which the physical quantity exceeds the second threshold value.

6. An imaging device, comprising:

an imaging device body including an imaging element that receives reflected light representing a subject as a subject image, and a body-side suppression unit that suppresses an influence of vibration, which is applied to a device, on the subject image on the basis of a detection result of a detection unit that detects the vibration; and a control unit that effects control on the body-side suppression unit so as to suppress the influence of vibration in accordance with a degree of limitation that is a degree for limiting the suppression of the influence performed by the body-side suppression unit and that is determined in accordance with information related to an interchangeable imaging lens mounted on the imaging device body, wherein:

the influence is broadly classified as comprising a rotation influence that rotates the subject image about a center of the imaging lens and a non-rotation influence that is a different influence from the rotation influence, the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result, the control unit effects, on the body-side suppression unit, control causing the body-side suppression unit to perform only the rotation influence-suppression processing or control causing the body-side suppression unit to perform, of the rotation influence-suppression processing or the non-rotation influence-suppression processing, at least the non-rotation influence-suppression processing, in accordance with the information, the information includes a focal length of the imaging lens and a physical quantity representing optical characteristics of a peripheral area of the imaging lens, and the degree of limitation is determined according to the focal length and the physical quantity.

7. The imaging device according to claim 6, wherein the control unit effects control on the body-side suppression unit so as to cause the body-side suppression unit to perform only the rotation influence-suppression processing in a case in which the focal length is equal to or smaller than a first threshold value and the physical quantity is equal to or smaller than a second threshold value.

8. The imaging device according to claim 6, wherein the control unit effects control on the body-side suppression unit to cause the body-side suppression unit to perform, of the rotation influence-suppression processing or the non-rotation influence-suppression processing, at least the non-rotation influence-suppression processing in a case in which the focal length exceeds a first threshold value and the physical quantity exceeds a second threshold value.

9. The imaging device according to claim 8, wherein the control unit effects control on the body-side suppression unit so as to perform the non-rotation influence-suppression processing in a state in which straight movement of the imaging element in a maximum movable range, which is a range in which the imaging element is movable in a straight direction to a maximum, is prevented in a case in which the focal length exceeds the first threshold value and is equal to or smaller than a third threshold value, which is a value exceeding the first threshold value, and the physical quantity exceeds the second threshold value and is equal to or smaller than a fourth threshold value, which is a value exceeding the second threshold value.

10. The imaging device according to claim 8, wherein the control unit effects control on the body-side suppression unit so as to perform the non-rotation influence-suppression processing in a state in which straight movement of the imaging element in a maximum movable range, which is a range in which the imaging element is movable in a straight direction to a maximum, is allowed in a case in which the focal length exceeds a third threshold value, which is a value exceeding the first threshold value, and the physical quantity exceeds a fourth threshold value, which is a value exceeding the second threshold value.

11. The imaging device according to claim 1, wherein, in a case in which the imaging lens is provided with a zoom lens, the degree of limitation is determined according to the focal length on the premise that the zoom lens is stopped.

12. The imaging device according to claim 1, wherein:
the information includes a stop value related to the imaging lens, and
the degree of limitation is reduced as the stop value is increased.

13. The imaging device according to claim 1, wherein the degree of limitation in a case of a video acquisition mode, which is an operating mode in which a video generated on the basis of a light-receiving result of the imaging element is acquired, is larger than the degree of limitation in a case of a static image acquisition mode, which is an operating mode in which a static image generated on the basis of a light-receiving result of the imaging element is acquired.

14. An imaging control method, comprising:
effecting control on a body-side suppression unit of an imaging device body so as to suppress, in accordance with a degree of limitation, an influence of vibration, which is applied to a device, on a subject image, the imaging device body including an imaging element that receives reflected light representing a subject as the subject image, and the body-side suppression unit, which suppresses the influence of the vibration on the subject image on the basis of a detection result of a detection unit that detects the vibration, and the degree of limitation being a degree for limiting the suppression of the influence performed by the body-side suppression unit included in the imaging device body and being determined in accordance with information related to an interchangeable imaging lens mounted on the imaging device body, wherein:

the influence is broadly classified as comprising a rotation influence that rotates the subject image about a center of the imaging lens and a non-rotation influence that is a different influence from the rotation influence, the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result, the information includes a focal length of the imaging lens, and the degree of limitation is determined according to the focal length, the imaging control method further comprising:
effecting control on the body-side suppression unit so as to cause the body-side suppression unit to perform only the rotation influence-suppression processing in a case in which the focal length is equal to or smaller than a first threshold value, and effecting control on the body-side suppression unit so as to cause the body-side suppression unit to perform, of the rotation influence-suppression processing or the non-rotation influence-suppression processing, at least the non-rotation influence-suppression processing in a case in which the focal length exceeds the first threshold value.

15. An imaging control method, comprising:
effecting control on a body-side suppression unit of an imaging device body so as to suppress, in accordance with a degree of limitation, an influence of vibration, which is applied to a device, on a subject image, the imaging device body including an imaging element that receives reflected light representing a subject as the subject image, and the body-side suppression unit, which suppresses the influence of the vibration on the subject image on the basis of a detection result of a detection unit that detects the vibration, and the degree of limitation being a degree for limiting the suppression of the influence performed by the body-side suppression unit included in the imaging device body and being determined in accordance with information related to an interchangeable imaging lens mounted on the imaging device body, wherein:
the influence is broadly classified as comprising a rotation influence that rotates the subject image about a center of the imaging lens and a non-rotation influence that is a different influence from the rotation influence, and
the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result,
the imaging control method further comprising:
effecting, on the body-side suppression unit, control causing the body-side suppression unit to perform only the rotation influence-suppression processing or control causing the body-side suppression unit to perform, of the rotation influence-suppression processing or the non-rotation influence-suppression processing, at least the non-rotation influence-suppression processing, in accordance with the information, wherein:
the information includes a physical quantity representing optical characteristics of a peripheral area of the imaging lens, and
the degree of limitation is determined according to the physical quantity.

16. An imaging control method, comprising:
effecting control on a body-side suppression unit of an imaging device body so as to suppress, in accordance with a degree of limitation, an influence of vibration, which is applied to a device, on a subject image, the imaging device body including an imaging element that receives reflected light representing a subject as the subject image, and the body-side suppression unit, which suppresses the influence of the vibration on the subject image on the basis of a detection result of a detection unit that detects the vibration, and the degree of limitation being a degree for limiting the suppression of the influence performed by the body-side suppression unit included in the imaging device body and being determined in accordance with information related to an interchangeable imaging lens mounted on the imaging device body, wherein:
the influence is broadly classified as comprising a rotation influence that rotates the subject image about a center of the imaging lens and a non-rotation influence that is a different influence from the rotation influence, and
the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result,
the imaging control method further comprising:
effecting, on the body-side suppression unit, control causing the body-side suppression unit to perform only the rotation influence-suppression processing or control causing the body-side suppression unit to perform, of the rotation influence-suppression processing or the non-rotation influence-suppression processing, at least the non-rotation influence-suppression processing, in accordance with the information, wherein:
the information includes a focal length of the imaging lens and a physical quantity representing optical characteristics of a peripheral area of the imaging lens, and
the degree of limitation is determined according to the focal length and the physical quantity.

17. A non-transitory computer-readable storage medium storing a program for causing a computer to execute a process, the process comprising:
effecting control on a body-side suppression unit of an imaging device body so as to suppress, in accordance with a degree of limitation, an influence of vibration, which is applied to a device, on a subject image, the imaging device body including an imaging element that receives reflected light representing a subject as the subject image, and the body-side suppression unit, which suppresses the influence of the vibration on the subject image on the basis of a detection result of a detection unit that detects the vibration, and the degree of limitation being a degree for limiting the suppression of the influence performed by the body-side suppression unit included in the imaging device body and being determined in accordance with information related to an interchangeable imaging lens mounted on the imaging device body, wherein:
the influence is broadly classified as comprising a rotation influence that rotates the subject image about a center of the imaging lens and a non-rotation influence that is a different influence from the rotation influence,
the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result,
the information includes a focal length of the imaging lens, and
the degree of limitation is determined according to the focal length,
the process further comprising:
effecting control on the body-side suppression unit so as to cause the body-side suppression unit to perform only the rotation influence-suppression processing in a case in which the focal length is equal to or smaller than a first threshold value, and effecting control on the body-side suppression unit so as to cause the body-side suppression unit to perform, of the rotation influence-suppression processing or the non-rotation influence-suppression processing, at least the non-rotation influence-suppression processing in a case in which the focal length exceeds the first threshold value.

18. A non-transitory computer-readable storage medium storing a program for causing a computer to execute a process, the process comprising:
effecting control on a body-side suppression unit of an imaging device body so as to suppress, in accordance with a degree of limitation, an influence of vibration, which is applied to a device, on a subject image, the imaging device body including an imaging element that receives reflected light representing a subject as the subject image, and the body-side suppression unit, which suppresses the influence of the vibration on the subject image on the basis of a detection result of a detection unit that detects the vibration, and the degree of limitation being a degree for limiting the suppression of the influence performed by the body-side suppression unit included in the imaging device body and being determined in accordance with information related to an interchangeable imaging lens mounted on the imaging device body, wherein:
the influence is broadly classified as comprising a rotation influence that rotates the subject image about a center of the imaging lens and a non-rotation influence that is a different influence from the rotation influence, and
the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result,
the process further comprising:
effecting, on the body-side suppression unit, control causing the body-side suppression unit to perform only the rotation influence-suppression processing or control causing the body-side suppression unit to perform, of the rotation influence-suppression processing or the non-rotation influence-suppression processing, at least the non-rotation influence-suppression processing, in accordance with the information, wherein:
the information includes a physical quantity representing optical characteristics of a peripheral area of the imaging lens, and
the degree of limitation is determined according to the physical quantity.

19. A non-transitory computer-readable storage medium storing a program for causing a computer to execute a process, the process comprising:
effecting control on a body-side suppression unit of an imaging device body so as to suppress, in accordance with a degree of limitation, an influence of vibration, which is applied to a device, on a subject image, the imaging device body including an imaging element that receives reflected light representing a subject as the subject image, and the body-side suppression unit, which suppresses the influence of the vibration on the subject image on the basis of a detection result of a detection unit that detects the vibration, and the degree of limitation being a degree for limiting the suppression of the influence performed by the body-side suppression unit included in the imaging device body and being determined in accordance with information related to an interchangeable imaging lens mounted on the imaging device body, wherein:
the influence is broadly classified as comprising a rotation influence that rotates the subject image about a center of the imaging lens and a non-rotation influence that is a different influence from the rotation influence, and
the body-side suppression unit is configured to selectively perform rotation influence-suppression processing for suppressing the rotation influence by rotating the imaging element about the center of the imaging lens on the basis of the detection result, and non-rotation influence-suppression processing for suppressing the non-rotation influence by moving the imaging element straight within a predetermined plane crossing an optical axis on the basis of the detection result,
the process further comprising:
effecting, on the body-side suppression unit, control causing the body-side suppression unit to perform only the rotation influence-suppression processing or control causing the body-side suppression unit to perform, of the rotation influence-suppression processing or the non-rotation influence-suppression processing, at least the non-rotation influence-suppression processing, in accordance with the information, wherein:
the information includes a focal length of the imaging lens and a physical quantity representing optical characteristics of a peripheral area of the imaging lens, and
the degree of limitation is determined according to the focal length and the physical quantity.

* * * * *